(12) United States Patent
Won et al.

(10) Patent No.: US 11,545,047 B1
(45) Date of Patent: Jan. 3, 2023

(54) USING BIOMETRIC DATA INTELLIGENCE FOR EDUCATION MANAGEMENT

(71) Applicant: Knowledge AI Inc., Boston, MA (US)

(72) Inventors: Joonhee Won, Cambridge, MA (US); Long Ngoc Phan, Winchester, MA (US); Minchol Kang, Gyeonggi-do (KR); Baha aldeen Elayan Abunojaim, San Mateo, CA (US)

(73) Assignee: Knowledge AI Inc., Boston, MA (US)

( * ) Notice: Subject to any disclaimer, the term of this patent is extended or adjusted under 35 U.S.C. 154(b) by 0 days.

(21) Appl. No.: 17/357,070

(22) Filed: Jun. 24, 2021

(51) Int. Cl.
| | |
|---|---|
| *G09B 19/00* | (2006.01) |
| *G09B 7/02* | (2006.01) |
| *G09B 7/00* | (2006.01) |
| *G10L 15/26* | (2006.01) |
| *G09B 11/00* | (2006.01) |
| *G06F 3/04883* | (2022.01) |

(52) U.S. Cl.
CPC .............. *G09B 19/00* (2013.01); *G09B 7/02* (2013.01); *G06F 3/04883* (2013.01); *G09B 7/00* (2013.01); *G09B 11/00* (2013.01); *G10L 15/26* (2013.01)

(58) Field of Classification Search
CPC . G09B 19/00; G09B 7/02; G09B 7/00; G09B 11/00; G06F 3/04883; G10L 15/26
See application file for complete search history.

(56) References Cited

U.S. PATENT DOCUMENTS

| | | | | |
|---|---|---|---|---|
| 6,215,901 B1 | * | 4/2001 | Schwartz | G06V 30/1423 382/187 |
| 11,073,921 B2 | * | 7/2021 | Weidler | G06F 3/0317 |
| 2007/0105079 A1 | * | 5/2007 | O'Toole | G09B 19/00 434/236 |

(Continued)

FOREIGN PATENT DOCUMENTS

| | | |
|---|---|---|
| JP | 2009031614 | 2/2009 |
| JP | 2015161892 | 9/2015 |

(Continued)

OTHER PUBLICATIONS

International Search Report and Written Opinion in International Appln. No. PCT/US2022/034430, dated Jul. 28, 2022, 10 pages.

*Primary Examiner* — Jack Yip
(74) *Attorney, Agent, or Firm* — Fish & Richardson P.C.

(57) ABSTRACT

Methods, systems, and apparatus, including computer programs encoded on computer storage media, for developing cognitive and behavioral metrics associated with a user. In some implementations, a system obtains data from a writing implement, the data indicative of a user performing a task by writing with the writing implement against a receiving device. The system extracts features from the obtained data. The system determines metrics that reflect characteristics of the user, the metrics that reflect cognitive characteristics of the user and metrics that reflect behavioral characteristics of the user. Based on the extracted features and the determined metrics, the system generates a user profile for the user. Based on the features indicating characteristics of the writ- (Continued)

ing behavior of the user, the system modifies the generated user profile as a performance of the user changes over time. The system provides recommendations to improve the performance of the user.

21 Claims, 12 Drawing Sheets

(56) References Cited

U.S. PATENT DOCUMENTS

| | | | | |
|---|---|---|---|---|
| 2009/0003705 | A1* | 1/2009 | Zou | G06V 30/347 |
| | | | | 382/187 |
| 2010/0021022 | A1* | 1/2010 | Pittel | G06F 3/03545 |
| | | | | 206/320 |
| 2010/0104189 | A1* | 4/2010 | Aravamudhan | G06V 30/36 |
| | | | | 382/187 |
| 2011/0188783 | A1* | 8/2011 | Minoni | G09B 21/006 |
| | | | | 382/314 |
| 2013/0085955 | A1* | 4/2013 | Dugas | G09B 5/00 |
| | | | | 705/326 |
| 2013/0109003 | A1 | 5/2013 | Lee | |
| 2013/0207937 | A1* | 8/2013 | Lutian | G06F 3/042 |
| | | | | 345/175 |
| 2013/0229390 | A1* | 9/2013 | DiVerdi | G06F 3/0488 |
| | | | | 345/179 |
| 2013/0257777 | A1* | 10/2013 | Benko | G06F 3/0383 |
| | | | | 345/173 |
| 2014/0272840 | A1* | 9/2014 | Peterson | G09B 19/00 |
| | | | | 434/236 |
| 2018/0350015 | A1 | 12/2018 | Gordon et al. | |
| 2019/0347953 | A1* | 11/2019 | Won | G06F 3/04883 |
| 2020/0278760 | A1* | 9/2020 | Kämpf | G06F 3/0346 |
| 2021/0132709 | A1* | 5/2021 | Tatani | G06F 3/011 |

FOREIGN PATENT DOCUMENTS

| | | |
|---|---|---|
| KR | 10-2010-0132217 | 12/2010 |
| KR | 101581921 | 12/2015 |
| KR | 101811543 | 12/2017 |
| WO | WO 2012127798 | 9/2012 |

* cited by examiner

200

▷ Page:0.329.3244.0.54
▷ Page:0.329.3244.0.55
▷ Page:0.329.3244.0.56
▷ Page:0.329.3244.0.57
▲ Page:0.329.3244.0.58
    ▲ Stroke:1
        Coordinate. x:051.94 y:053.70 force: 070 time: 2017-10-26 11:13:52:624
        Coordinate. x:051.75 y:053.74 force: 062 time: 2017-10-26 11:13:52:636
        Coordinate. x:051.79 y:053.93 force: 053 time: 2017-10-26 11:13:52:649
        Coordinate. x:051.75 y:053.19 force: 054 time: 2017-10-26 11:13:52:663
        Coordinate. x:051.79 y:053.71 force: 049 time: 2017-10-26 11:13:52:676
        Coordinate. x:051.79 y:055.35 force: 046 time: 2017-10-26 11:13:52:689
        Coordinate. x:051.75 y:056.03 force: 045 time: 2017-10-26 11:13:52:700
        Coordinate. x:051.68 y:056.59 force: 044 time: 2017-10-26 11:13:52:714
        Coordinate. x:051.64 y:056.93 force: 044 time: 2017-10-26 11:13:52:728
        Coordinate. x:051.64 y:057.04 force: 043 time: 2017-10-26 11:13:52:742
        Coordinate. x:051.71 y:057.11 force: 043 time: 2017-10-26 11:13:52:753
        Coordinate. x:051.86 y:057.11 force: 043 time: 2017-10-26 11:13:52:767
        Coordinate. x:052.24 y:057.19 force: 043 time: 2017-10-26 11:13:52:781
        Coordinate. x:052.73 y:057.08 force: 043 time: 2017-10-26 11:13:52:792
        Coordinate. x:053.36 y:057.04 force: 043 time: 2017-10-26 11:13:52:806
        Coordinate. x:054.00 y:056.93 force: 054 time: 2017-10-26 11:13:52:820
        Coordinate. x:054.56 y:057.00 force: 066 time: 2017-10-26 11:13:52:835
        Coordinate. x:054.94 y:057.00 force: 188 time: 2017-10-26 11:13:52:847
        Coordinate. x:055.16 y:057.04 force: 255 time: 2017-10-26 11:13:52:860
▷ Stroke: 2
▷ Stroke: 3
▷ Stroke: 4
▷ Stroke: 5
▷ Stroke: 6
▷ Stroke: 7
▷ Stroke: 8
▷ Stroke: 9
▷ Stroke: 10
▷ Stroke: 11
▷ Stroke: 12
▷ Stroke: 13
▷ Stroke: 14
▷ Stroke: 15
▷ Stroke: 16
▷ Stroke: 17
▷ Stroke: 18
▷ Stroke: 19

FIG. 2

Alex
27 Nov, 2020

The quick brown fox jumps over the lazy dog
In education today, students are assessed, too simplistically, on absolute scores. Since students learn at different levels and different speeds, this practice is outdated practice, inefficient and incomplete, leaving students either unchallenged or overburdened.

To address this critical need for change in education, Anoto introduced KAIT - a new and innovative AI - powered platform focused on enabling personalized learning and improving learning efficiencies.
Our goal is to disrupt global education and improve efficiency for both teachers and students.

FIG. 5A

Angela Santos
November 29 2020

The quick brown fox jumps over the lazy dog.

In education today students are assessed too simplistically, on absolute scores. Since srudents learn at different levels and different speeds, this practice is outdated inefficient and incomplete, leaving students either unchallenged or overburdened To address this critical need for change in education. Anoto introduced KAIT - a new and innovative AI - powered platform focused on enabling personalized learning and improving learning efficiencies.

Our goal is to disrupt global education and improve efficiency for both teacher and students.

FIG. 5B

Mohammad Aziz Yousef
Nov 26, 2020

The quick brown fox jump over the lazy dog.

In education today, students are assessed, too simplistically, on absolute scores. Since students learn at different levels and different speeds, this practice is outdated, inefficient and incomplete, leaving students either unchallenged or overburdened.

To address this critical need for change in education, Anoto introduced KAIT - a new and innovative AI - powered platform focused on enabling personalized learning and improving learning efficiencies.

Our goal is to disrupt global education and improve efficiency for both teacher and students.

```
┌─────────────────────────────────────────────────────────────────┐
│ Obtaining, by the computing system, data from a writing         │
│ implement, the data indicative of a user performing a task by   │
│ writing with the writing implement against a receiving device   │
│                                                           702   │
└─────────────────────────────────────────────────────────────────┘
                                 ↓
┌─────────────────────────────────────────────────────────────────┐
│ Extracting, by the computing system, features from the obtained │
│ data, the features indicating characteristics of a writing      │
│ behavior of the user while the user performs the task with the  │
│ writing implement                                         704   │
└─────────────────────────────────────────────────────────────────┘
                                 ↓
┌─────────────────────────────────────────────────────────────────┐
│ Determining, by the computing system, based on at least some of │
│ the extracted features from the obtained data, metrics that     │
│ reflect characteristics of the user                       706   │
└─────────────────────────────────────────────────────────────────┘
                                 ↓
┌─────────────────────────────────────────────────────────────────┐
│ Based on the extracted features, the determined metrics, or     │
│ both, generating, by the computing system, a user profile for   │
│ the user                                                  708   │
└─────────────────────────────────────────────────────────────────┘
                                 ↓
┌─────────────────────────────────────────────────────────────────┐
│ Based on the features indicating characteristics of the writing │
│ behavior of the user, modifying, by the computing system, the   │
│ generated user profile as a performance of the user changes     │
│ over time                                                 710   │
└─────────────────────────────────────────────────────────────────┘
                                 ↓
┌─────────────────────────────────────────────────────────────────┐
│ Providing, by the computing system, recommendations to improve  │
│ the performance of the user associated with the generated user  │
│ profile, the recommendations based on the determined metrics    │
│ and the generated profile                                 712   │
└─────────────────────────────────────────────────────────────────┘
```

```
┌─────────────────────────────────────────────────────────────────────┐
│ Obtaining, by the computing system, data from a writing implement,  │
│ the data indicative of a user writing a series of characters with   │
│ the writing implement on a receiving device                     802 │
└─────────────────────────────────────────────────────────────────────┘
                                  ↓
┌─────────────────────────────────────────────────────────────────────┐
│ Extracting, by the computing system, features from the obtained     │
│ data, the features indicating characteristics of a writing behavior │
│ of the user while writing the series of characters              804 │
└─────────────────────────────────────────────────────────────────────┘
                                  ↓
┌─────────────────────────────────────────────────────────────────────┐
│ Comparing, by the computing system, a characteristic dataset based  │
│ on the extracted features to one or more stored characteristic      │
│ datasets for the same series of characters                      806 │
└─────────────────────────────────────────────────────────────────────┘
                                  ↓
┌─────────────────────────────────────────────────────────────────────┐
│ In response to identifying a stored characteristic dataset that     │
│ matches the characteristic dataset based on the extracted features, │
│ validating an identity of the user                              808 │
└─────────────────────────────────────────────────────────────────────┘
```

FIG. 8

USING BIOMETRIC DATA INTELLIGENCE FOR EDUCATION MANAGEMENT

BACKGROUND

Conventional test-taking methods typically focus on whether an individual answers a question correctly or incorrectly. In these conventional methods, a test can pose a question for an individual to answer in a subjective response or through objectivity, by selecting among one or more answers. However, these conventional test-taking methods only evaluate whether an answer is correct and do not evaluate or focus on the individual taking the test.

SUMMARY

In some implementations, a computing system uses biometric data obtained from a writing implement to develop cognitive metrics and behavioral metrics associated with a user. In particular, the computing system instructs a user to perform a task with a writing implement. The task can be an academic task (e.g., a homework or exam problem, an essay or short response), a professional task (e.g., a job application activity), or another type of task. For instance, when the task is an academic task, the computing system can instruct the user to, for example, solve an algebraic equation, write out a sentence, answer a reading comprehension question, solve a logical game question, and the like. The user performs the task with a writing implement, such as a smart pen, a smart stylus, or some other form of a writing device. The user can perform the task by interacting with the writing implement, such as writing with the writing implement on a receiving device, such as paper, smart paper, or a tablet screen. The user performs the task by writing notes to identify what the task is asking, writing various methods to perform the task, writing out one or more potential solutions to the task, and writing a solution identified and developed by the user, to name a few examples. The receiving device, the writing implement, or both can communicate with the computing system. The computing system obtains data from one or more of the receiving device or the writing implement and determine, based on the obtained data, various metrics characterizing the user's performance of the task or characterizing the user.

The computing system extracts features from the obtained biometric data. The features extracted from the obtained biometric data describe a manner in which the user performs the task with the writing implement. The biometric data can be used similar to a blueprint to identify characteristics of the user. These features can include spatial features, temporal features, pressure features, textual features, tilt features, or combinations thereof. The features can also include textual features that are provided from optical character recognition techniques. Each of these extracted features indicates characteristics of a writing behavior of the user while performing the task, e.g., how the user used the writing implement perform the task. The spatial features describe the spatial representations of the motion of the writing implement while user performs the task (e.g., representations of words, letters, or numbers written by the user). The temporal features describe temporal elements of the handwriting path, such as speed and acceleration with which the writing implement was used while performing the task. The pressure features denote an amount of pressure the user applied to the receiving device with the writing implement while performing the task. The tilt features denote the tilt angle of the writing implement while the user performed the task. The computing system may extract other features from the obtained data, such as user data (e.g., temperature or heart rate of the user) or environmental data (e.g., audio or video images of an environment of the user, temperature of the environment).

Based on the features extracted from the obtained biometric data, the computing system determines metrics that characterize the user. The metrics can include, for example, cognitive metrics, behavioral metrics, or both. The cognitive and behavioral metrics can include synthetic metrics that characterize (e.g., measure) aspects of the user's learning and mental abilities. The synthetic metrics can be based on newly created metrics. For example, the computing system create other synthetic metrics that are separate from the metrics created by the cognitive and behavioral metrics. These cognitive and behavioral metrics can be applied to, e.g., students performing academic tasks, medical professionals, business professionals, and professionals applying to job applications, among others.

As will be further described below, the cognitive and behavioral metrics can include toolsets that characterize or diagnose a user using the writing implement. For instance, in an educational environment, the determined cognitive and behavioral metrics indicate to a teacher how well his/her students are learning. The cognitive and behavioral metrics can indicate strengths and weaknesses of each student. Generally, students have different strengths and weaknesses, and a benefit of the system with the writing implement is that these cognitive and behavioral metrics can not only define how well a student is learning, but can also aid in generating individualized recommendations to improve learning in each student. Thus, this system can provide specifically tailored feedback to each particular user, with the feedback having been developed based on that user's own set of cognitive and behavioral metrics generated responsive to that user's use of the writing implement.

Returning to the education example, the cognitive and behavioral metrics can reflect cognitive and behavioral characteristics that can be analyzed to help improve, e.g., optimize a learning environment for the student. The cognitive metrics include, for example, a number sense metric, a memory visualization metric, a reasoning metric, and an apply connections metric. The behavioral metrics include, for example, a test taking skill metric, a grit metric, a concentration metric, and a question comprehension metric. The computing system can evaluate and determine values for each of these cognitive, behavioral metrics, and other synthetically created metrics for the student using the writing implement by combining various extracted features.

In another environment, such as a professional environment, the user writes with the writing implement in a job application. The determined cognitive and behavioral metrics can indicate, to a recruiter or hiring manager, characteristics that indicate whether the applicant would be a good fit for a job. In some cases, the applicant may only need to write a few sentences with the writing implement for the reviewer to decide whether the applicant should move to the next round of the job interview. This may be the case when the reviewer is searching for an applicant with grit and concentration as strong skill sets. In another environment, such as with the use of a psychometrics test, a user can write and be analyzed using an AI-based skillset evaluation, which can be vastly enhanced by time data and cognitive and behavioral metrics.

The computing system can generate profiles of users that write with the writing implement. For example, the computing system can generate a profile for the user that includes values for each of the number sense metric, the memory visualization metric, the reasoning metric, the apply connections metric, the test taking skill metric, the grit metric, the concentration metric, and the question comprehension metric. The computing system may also associate other values with the generated user profile, such as the extracted features, and the raw data from both the writing implement and the receiving device.

In some implementations, the computing system stores profiles for various users in a database. When a user performs a task with the writing implement, the computing system generates a profile for the user and performs identity verification of the user. The computing system can compare the generated user profile to stored profiles for the various users and determine whether the current writer is a previously recognized user based on a match between the generated user profile and one of the stored profiles. In this sense, the computing system can identify the user through their cognitive and behavioral metrics, the characteristics of the user's writing behavior, or both. If the computing system identifies a previously recognized user, the computing system can generate recommendations tailored to the user's performance. Alternatively, if the computing system does not match the user to a previously recognized user, the computing system can store the generated user profile in the database as a new user.

The computing system offers benefits to users who perform tasks with the writing implements. In some implementations, the computing system can generate recommendations tailored to the user based on the cognitive and behavioral metrics of the user performing the task with the writing implement. For example, the computing system may instruct the user to solve an algebraic equation with the writing implement if the computing system determines that the user's grit metric and test taking skill metric are low. Moreover, and as will be further described below, the computing system may provide recommendations that help the user improve the metrics defined in the user's profile. These recommendations can provide to a client device of the user or to a supervisor monitoring over the progress of the user. The computing system can store the provided recommendations and compare them with subsequent determined values of cognitive and behavioral metrics to determine if these recommendations were in fact helpful.

In one general aspect, a method performed by a computing system includes: obtaining, by the computing system, data from a writing implement, the data indicative of a user performing a task by writing with the writing implement against a receiving device; extracting, by the computing system, features from the obtained data, the features indicating characteristics of a writing behavior of the user while the user performs the task with the writing implement; determining, by the computing system, based on at least some of the extracted features from the obtained data, metrics that reflect characteristics of the user, the metrics including cognitive metrics that reflect cognitive characteristics of the user, behavioral metrics that reflect behavioral characteristics of the user, or both; based on the extracted features, the determined metrics, or both, generating, by the computing system, a user profile for the user; based on the features indicating characteristics of the writing behavior of the user, modifying, by the computing system, the generated user profile as a performance of the user changes over time; and providing, by the computing system, recommendations to improve the performance of the user associated with the generated user profile, the recommendations based on the determined metrics and the generated profile.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the receiving device includes at least one of paper, smart paper, a tablet, or a computer screen.

In some implementations, obtaining the data from the writing implement includes: obtaining, by the computing system, environmental data that include one or both of (i) media illustrating recorded video or images of the user performing the task with the writing implement and an environment in which the user is performing the task with the writing implement and (ii) audio data recorded in the environment indicative of audible noises while the user is performing the task with the writing implement.

In some implementations, the method includes obtaining, by the computing system, one or more of: test question data that describe (i) one or more questions posed to the user to be answered with the writing implement and receiving device, (ii) a correct answer to each of the one or more questions, and (iii) an answer rubric, and input data that describe (i) data identifying the writing implement and (ii) credentials of the user writing with the writing implement; and wherein the recommendations to improve the performance of the user are further based on the test question data, the input data, or both.

In some implementations, extracting the features from the obtained data includes one or more of: extracting, by the computing system, spatial features that describe spatial features of handwritten text produced by the user with the writing implement while performing the task; extracting, by the computing system, temporal features that describe temporal elements of handwritten movements produced by the user with the writing implement while performing the task; extracting, by the computing system, pressure features that describe a pressure recorded between a tip of the writing implement and the receiving device while the user performs the task; extracting, by the computing system, tilt features that describe one or more tilting angles of the writing implement while the user performs the task; and extracting, by the computing system, textual features that describe characteristics of the written letters and numbers with the writing implement, wherein the textual features also comprise time stamps associated with each of the handwritten text.

In some implementations, determining metrics based on the at least some of the extracted features includes generating the cognitive metrics, including one or more of: generating, by the computing system, a number sense metric; generating, by the computing system, a memory visualization metric; generating, by the computing system, a reasoning metric; and generating, by the computing system, an applicable connections metric.

In some implementations, determining metrics based on the at least some of the extracted features further includes generating the behavioral metrics, including one or more of: generating, by the computing system, a test taking skill metric; generating, by the computing system, a grit metric; generating, by the computing system, a concentration metric; and generating, by the computing system, a question comprehension metric.

In some implementations, generating the user profile includes generating, by the computing system, a score associated with each of the number sense metric, the memory visualization metric, the reasoning metric, the applicable connections metric, the test taking skill metric, the grit metric, the concentration metric, and the question comprehension metric.

In some implementations, providing the recommendations to improve the performance of the user includes providing, to a computing device associated with the user or a supervisor of the user, one or more of: an indication of whether a written response by the user is correct or incorrect, the written response associated with the user performing the task; a grit metric; and one or more corrective actions to improve performance of the user, the one or more corrective actions including at least one of (i) instructions to perform additional tasks of a similar type to the task, (ii) instructions to reduce an amount of noise in an environment, (iii) medical information of the user, and (iv) instructions to change writing approach.

In some implementations, the method further includes comparing, by the computing system, the generated profile to stored profiles; and identifying, by the computing system, the user based on a match between the generated profile and one of the stored profiles.

In a general aspect, a method performed by a computing system includes: obtaining, by the computing system, data from a writing implement, the data indicative of a user writing a series of characters with the writing implement on a receiving device; extracting, by the computing system, features from the obtained data, the features indicating characteristics of a writing behavior of the user while writing the series of characters; comparing, by the computing system, a characteristic dataset based on the extracted features to one or more stored characteristic datasets for the same series of characters; and in response to identifying a stored characteristic dataset that matches the characteristic dataset based on the extracted features, validating an identity of the user.

Embodiments can include one or any combination of two or more of the following features.

In some implementations, the receiving device includes at least one of paper, smart paper, a tablet, or a computer screen.

In some implementations, extracting the features from the obtained data includes one or more of: extracting, by the computing system, spatial features that describe spatial features of handwritten text produced by the user with the writing implement while performing the task; extracting, by the computing system, temporal features that describe temporal elements of handwritten movements produced by the user with the writing implement while performing the task; extracting, by the computing system, pressure features that describe pressure recorded between a tip of the writing implement and the receiving device while the user performs the task; and extracting, by the computing system, tilt features that describe one or more tilting angles of the writing implement while the user performs the task.

In some implementations, the method includes based on the extracted features, measuring an amount of ink generated by the writing implement for each character in the series of characters.

In some implementations, the method includes the characteristic dataset includes data based on the measured amount of ink for each character.

In some implementations, comparing the characteristic dataset to the one or more stored datasets includes comparing the amount of ink for each character written by the user to the one or more stored datasets using a heuristic analysis.

In some implementations, the method includes validating an identity of the user includes determining whether credentials of the user match to an identification of a user associated with the identified stored dataset.

In some implementations, the method includes, in response to determining that the credentials of the user match to the identification of the user associated with the identified dataset determining, by the computing system, that the user is not cheating.

In some implementations, in response to determining not identifying a stored characteristic dataset that matches the characteristic dataset: providing, by the computing system, an indication that the user writing the statement is another user.

In some implementations, the method includes: providing, by the computing system, an indication to the user to write each letter of the alphabet in capital and lowercase and various numbers with the writing implement; obtaining, by the computing system, data from each letter or number written by the user with the writing implement; and storing, by the computing system, a template for each letter and number for the user in a dataset.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is an illustration of an example of input data obtained from a writing implement.

FIGS. 5A-5C are illustrations of examples of anti-cheating identification.

FIGS. 7 and 8 are flow diagrams.

Like reference numbers and designations in the various drawings indicate like elements.

DETAILED DESCRIPTION

Figure 1A:
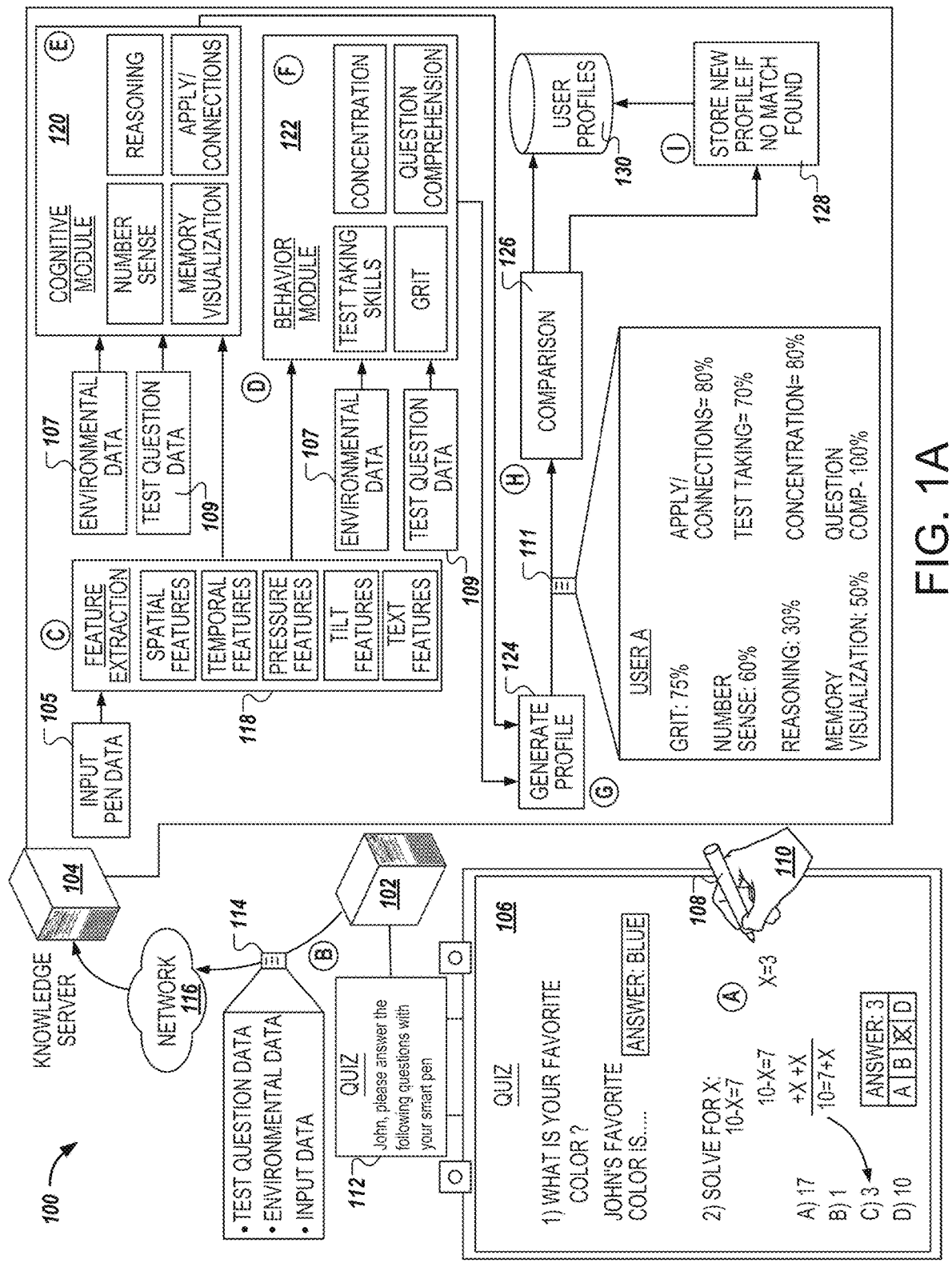
FIG. 1A is a block diagram that illustrates an example of a system for determining cognitive and behavioral metrics of an individual using a writing implement.

FIG. 1A is a block diagram that illustrates an example of a system 100 for determining cognitive and behavioral metrics of a user 110 using a writing implement. The example of FIG. 1A shows a user writing with the writing implement by performing a task in an educational environment, such as taking a pop quiz or test at school. However, the techniques described here can be applied to other systems as well, such as in professional environments where applicants apply for jobs and medical environments for diagnosing the cognitive and behavioral abilities of patients. The system 100 includes a computing system 102 that has a connected monitor or display 112. The user 110 writes with a writing implement 108 against a receiving device 106. The computing system 102 communicates with the receiving device 106, the writing implement 108, or both. FIG. 1A illustrates various operations in stages (A) through (I) which can be performed in the sequence indicated or in another sequence.

The system 100 also includes a network 116 and a knowledge server 104. In some implementations, the network 116 can include a local network or a network connected over the Internet. For instance, the network 116 can include a Bluetooth, Wi-Fi, ZigBee, or another form of communication connection. The receiving device 106, the writing implement 108, or both communicate with the computing system 102 over a local network of network 116. The computing system 102 communicates with the knowledge server 104 over a local network or over the Internet.

The computing system 102 can include a desktop, a laptop, a smart tablet, or a handheld device, to name a few examples. The writing implement 108 can be, for example, a smart pen, a smart stylus, or some other form of a writing device that communicates with the computing system 102. The receiving device 106 can include, for example, paper, smart paper, a tablet screen, or a screen of a laptop, desktop, or handheld device. The receiving device 106 can also include virtual collaboration whiteboards and smart screens, which can track the user's writing when linked with the writing implement 108.

As illustrated in system 100, the writing implement 108 can be a smart pen. The computing system 102 provides a task to the user 110, that the user 110 can perform by writing with the writing implement 108 on the receiving device 106. The task instructed by the computing system 102 can include, for example, solving a mathematical equation, writing out a sentence or a phrase, answering a reading comprehension question, solving a logical game, and performing other mathematical operations. In other situations, the task can include filling out a job application, writing statements to be analyzed for medicinal purposes, filling out contracts for government, military, and federal employees, and any other form of task that involves writing.

In the case that the writing implement 108 corresponds to a smart pen, the smart pen includes the capability to write by communicating with the receiving device 106. In particular, the receiving device 106 can record pressure and/or movements received by the tip of the smart pen while the pen is in contact with the receiving device 106. In response, the receiving device 106 can display digital ink in an amount and direction based on the pressure and movements applied by the smart pen by the user. For example, the user may be instructed with a task to write out a set of numbers, such as "345." When the user writes the number "4" with the smart pen on the receiving device 106, the receiving device 106 displays to the user the number "4" as written by the user. The manner in which the user writes the number "4," such as the speed of the user's hand movement, the length of each stroke in the written number "4," the amount of time taken to write the number "4," among other characteristics of the user's writing, are captured by the writing implement 108, the receiving device 106, or both. These characteristics are provided to the computing system 102, and ultimately, transmitted to the knowledge server 104 where additional processes take place. In some cases, only the writing implement 108 captures these characteristics and communicates with the computing system 102.

The knowledge server 104 extracts various features from the data provided by the computing system 102. These various features can include spatial features, temporal features, pressure features, tilt features, and textual features, to name a few examples. As mentioned, each of these features can denote and describe characteristics of how the user used the writing implement to perform the instructed task. In some implementations, each of these features can help define not only characteristics of how the user wrote with the writing implement, but also, characteristics of the user, such as the body temperature of the user while the user writes and a heart rate of the user while the user writes.

In some implementations, the knowledge server 104 determines metrics that reflect characteristics, e.g., cognitive metrics reflecting cognitive characteristics of the user, behavioral metrics reflecting behavioral characteristics of the user, or both. Said another way, by extracting out characteristics of the user's writing style and quirks, the knowledge server 104 can extrapolate, from the writing features, cognitive and/or behavioral characteristics of the user. This will be further discussed below. Additional discussion of cognitive and behavioral metrics can be found in U.S. Patent Publication No. 2019/0347953, the contents of which are incorporated here by reference in their entirety.

Generally, the coordination between the writing implement 108, the receiving device 106, the computing system 102, and the knowledge server 104 rely on a method known as item response theory. Item response theory is the idea that these components in system 100 can measure non-performing or non-performance related metrics to predict performance of a user. Typically, performance is measured by whether a task is performed correctly or incorrectly. However, with item response theory, the components of system 100 can analyze non-performance related metrics, e.g., extracted feature vectors, to predict the performance of user 110. For example, the knowledge server 104 can analyze the type of writing implement used, ink amount, writing length, the textual characteristics, and an amount of effort, among others, that the user is providing to perform the task. From that perspective, the knowledge server 104 can measure the user's performance not solely based on whether the user correctly performs the task, but the techniques and characteristics applied by the user to perform the task. Additionally, in item response theory, the knowledge server 104 can apply neural networks to measure non-performing or non-performance related metrics to predict performance of a user as the number of feature sets continue to grow and expand.

By measuring these cognitive and behavior abilities, the system 100 can use the cognitive and behavioral metrics as a synthetic toolset to help improve the performance of the user 110. For example, the system 100 can provide recommendations to the user 110 based on the generated cognitive and behavioral metrics. If the knowledge server 104 determines that one or more of the categories in the cognitive and behavioral metrics were low, then the knowledge server 104 can generate recommendations tailored to that user 110 to improve those low categories. In subsequent measurements of the user 110 with the writing implement 108, the goal is to see areas of improvement in the cognitive and behavioral metrics that were low in previous tasks. Thus, the system increases the performance of the user 110 in performing various tasks by analyzing and tailoring learning of the user 110. Additionally, by creating synthetic cognitive and behavioral metrics for evaluating user performance, these systems allow for a large library of cognitive and behavioral metrics to be created. These metrics can act as proxies that can be used for other and future researchers' projects.

During stage (A), the user 110 is instructed to perform a task. The computing system 102 can provide a task to the user 110 through the receiving device 106, in the case that the receiving device 106 is a smart tablet or a touch screen device. As illustrated in system 100, the task includes two questions that the user 110 is requested to answer. The first question asks the user 110 the following question: "What is your favorite color?" The second question asks the user 110 the following question: "Solve for X: 10−X=7". The receiving device 106 provides the user 110 with space to write down notes to identify the task, write various methods to perform the task, write one or more potential solutions to each task, and write out the identified solution to each task.

The user 110 answers the first question of the task using the writing implement 108. The answer to the first question includes "John's favorite color is . . . " and the phrase "Answer: Blue" circled. Then, the user 110 answers the second question of the task using the writing implement 108. As illustrated in example of system 100, the user 110 writes out the following answer to solve the problem—adding "X" to both sides of the equations to determine a new form of the equation as "10=7+X". Then, using deduction, the user 110 can determine that the value of "X" is "3". Consequently, the user 110 can select answer "C" in the box at the bottom of the receiving device 106.

As the user 110 writes with the writing implement 108, the receiving device 106 displays the results of the writing. The results can include the letters and numbers written by the user 110 with the writing implement 108 to perform the task. Once the user 110 has finished performing the task, the user 110 may tap a notification on the receiving device 106 or turn off the writing implement 108.

The writing implement 108, the receiving device 106, or both can provide raw data or biometric data to the computing system 102. The biometric data can be used similar to a blueprint to identify characteristics of the user. In this case, the biometric data can correspond to how the user 110 writes with the writing implement 108. The writing implement 108 may include a camera that records media of the user 110 writing the solution to the task and a microphone to record audio. The writing implement 108, the receiving device 106, or both can provide the raw data to the computing system 102 in real time. For example, the raw data can include video or images recorded by the camera in the writing implement 108, audio data recorded from the microphone of the writing implement 108, positional data showing the movement of the writing implement 108 as the user 110 performs the task, and an amount of digital ink generated by the receiving device 106 based on the pressure and movement applied by the writing implement 108. In some cases, the writing implement 108 alone can also measure and record an amount of digital ink provided to the receiving device 106 based on its applied pressure and movement. The raw data can also include other data sets, such as, written text, length of time for writing the letters and numbers and speed at which the letters and numbers were written.

During stage (B), the computing system 102 obtains the raw data or biometric data from the writing implement 108, the receiving device 106, or both. In some implementations, the computing system 102 can generate a package to provide to the knowledge server 104 over network 116. The package can include test question data, the environmental data, and the input data. In some implementations, the writing implement 108, the receiving device 106, or both can provide the raw data directly to the knowledge server 104. In the case that the writing implement 108, the receiving device 106, or both communicate directly with the knowledge server 104 and bypass the computing system 102, the computing system 102 can provide the test question data and environmental data in a package to the knowledge server 104. In some implementations, some data are obtained from other sources. For instance, the test question data can be obtained from a data storage hosted on the computing system 102 or a data storage associated with the knowledge server 104.

In some implementations, the test question data can include data that describes the task to be performed. For example, the test question data can include the two questions asked for the user 110 to answer—1) What is your favorite color?; 2) Solve for X: 10−X=7. The test question data can also include the correct answers to each of those questions. In the case that a question is a subjective question and no right answer exists, then the test question data can include an indication that this is a subjective question. In some examples, e.g., if the question does include a correct answer, the test question data can include the list of possible answers, the answer identified by the user 110, and the actual answer to the question. The test question data can also include an answer rubric that can be used to evaluate the specific steps and approach taken to arrive at a particular answer to the problem.

In some implementations, the environmental data can include data that illustrates an environment surrounding the user 110 as the user 110 performs the task. For example, the environmental data can include video and/or photo data captured by the writing implement 108 that shows the writing of letters and numbers. Additionally, the video and photo data can show the facial expressions of the user 110 as the user 110 performs the task, which may aid in later developing the cognitive and behavioral metrics of user 110. The environmental data can also include audio and video data recorded by the computing system 102, which may monitor the user 110 and the environment surrounding the user 110. In this case, the audio and video may record noises or visible movements in the background of the user 110, such as TV noises, music, or one or more people moving behind user 110. The environmental data can further include positional data to determine a location of user 110 and where user 110 is performing the task. For example, the positional data can include GPS coordinates as well as data indicating the user 110 is located at home, at school, at a hospital, at a corporation, or in a coffee shop, to name a few examples.

In some implementations, the input data can include data provided by the user 110 for responding to the task. For example, the input data can include credentials of user 110. The credentials can include a username/email address and password of user 110 to verify that user 110 is authenticated to use the computing system 102, the knowledge server 104, and the writing implement 108. In some implementations, the user 110 can provide the credentials to the computing system 102 before performing the task with the writing implement 108 for authentication purposes.

The input data can also include data sources from external components. These external components can include input data from the keyboard associated with the computing system 102, input data from the mouse associated with the computing system 102, e.g., click data, pointer hovering, and pointer position in interface, touch screen data associated with the display 112, a pose of user 110 while performing the task, and GPS data associated with a client device of the user 110. This data can be added to the package 114 before transmitting.

The input data can also include identification data of the components in system 100. For example, the identification data can include data that represents the writing implement 108 and the represents the receiving device 106. This data can include an IP address, a MAC address, a labeled identifier, and a communication network ID, to name a few examples. The labeled identifier can indicate the type of device, for example, the labeled data can indicate that the writing implement 108 is a "SMART PEN" and the receiving device 106 is a "TABLET." The identification data can also include data that represents the computing system 102 that communicates with the writing implement 108 and the receiving device 106. For example, the data representing the computing system 102 can include a hostname, an IP address, a MAC address, and the like.

The input data can also include data obtained by the writing implement 108 and the receiving device 106 while the user performs the task. The data obtained by the writing implement 108 can include written text, positional data of the writing implement 108, speed of the writing implement 108, pressure amount of the writing implement 108, and timestamps associated with each of these writing implement 108 data points. The data obtained by the receiving device 106 can include data indicating amount of pressure received from the writing implement 108, an amount of digital ink generated that corresponds to the amount of pressure received from the writing implement 108, and locational data illustrating where the user wrote on the receiving device 106. In some cases, the writing implement 108 can measure and record each of the above mentioned examples of input data without the use of the receiving device 106.

In some implementations, the computing system 102 can generate a package 114 that includes the test question data, the environmental data, and the input data. The computing system 102 can transmit the package 114 to the knowledge server 104 over network 116. In some cases, the computing system 102 may store the package 114 in memory and send a notification to the computing system 102 that includes the location in memory of the package 114 for retrieval of the data. Memory can be located on the computing system 102 or at another location, such as an external database.

The computing system 102 can generate and transmit a package 114 to the knowledge server 104 on a periodic basis. As the writing implement 108 and the receiving device 106 obtain data, these devices can stream data in real-time or periodically to the computing system 102 or to the knowledge server 104. For example, the periodic basis can correspond to every 30 seconds while the user 110 performs the task or one time after the user 108 has finished performing the task.

During stage (C), the knowledge server 104 can receive or retrieve the package 114 from the computing system 102. In some implementations, the knowledge server 104 extracts the test question data, the environmental data, and the input data from the package 114. The knowledge server 104 can store the extracted test question data, environmental data, and input data in memory for later retrieval. In some cases, the knowledge server 104 may store this extracted data in a historical database for tracking progress of a particular user, e.g., user 110, over time.

As illustrated in system 100, the knowledge server 104 provides the input data to the feature extraction module 115. The feature extraction module 118 can extract from the input data a variety of features. The features can include, for example, spatial features, temporal features, pressure features, tilt features, and textual features. The spatial features can correspond to pure spatial features of the text written by user 110 with the writing implement 108. For example, these spatial features can include a density of the handwriting, spaces between different words, spaces between letters in each word, handwriting size, and tilt angles of the letters. The handwriting size can include the length of each word or letter in the vertical and horizontal direction as well as the width and height of each word or letter. These spatial features can be measured in centimeters or another unit of measurement that is set by a designer of the system 100.

The following list includes each of the spatial features that the feature extraction module 118 can determine. For example, the feature extraction module 118 can determine an ink length and a cross out count. The cross out count can include a synthesized feature that corresponds to a count of the number of removed words or the number of scratched out words. The feature extraction module 118 can also determine a word level label, an X and Y positions at the word level, a penInOutTime at the word level, a penDownTime at the word level, a penUpTime at the word level, a word length at the word level, an average speed at the word level, an X and Y positions at the letter level, a height of each letter, a width of each letter, a letter length, a letter writing time, a letter average speed, a number of strokes for a character at the letter level, a letter size, a handwriting density, space between words, acceleration, and angles for letters.

The X and Y positions at the word level correspond to a position of the word on the receiving device 106. The penInOutTime at the word level corresponds to the penDownTime plus the penUpTime. The penDownTime at the word level corresponds to the sum of all times taken when the writing implement 108 was down writing the letters. The penUpTime at the word level corresponds to the sum of the time the writing implement 108 was up away from the receiving device 106 while writing the word. The word length at the word level corresponds to the summation of the total ink length of all letters per word. The average speed corresponds to the word length at the word level divided by the penInOutTime. The X and Y positions at the letter level corresponds to the position for the letter on the receiving device 106. The letter length corresponds to the ink length of each letter. The letter writing time corresponds to the longest time taken to write a letter minus the shortest time taken to write a letter. The letter average speed corresponds to the letter length divided by the letter writing time. The letter size corresponds to the letter height times the letter width. The handwriting density is a product of the mass of ink length per unit volume. The space between words corresponds to the average space between each word. The acceleration corresponds to the rate of change of the velocity between various letters and words. Lastly, the angles for letters correspond to a shape description for each written letter.

The temporal features can include measurements that represent the temporal elements of a handwritten path. For example, these temporal elements can correspond to the speed taken by user 110 while writing with the writing implement 108 to perform the task. In particular, the speed can correspond to how fast user 110 writes each letter, how fast user 110 writes each word, the speed at which the user 110 moves between written letters and written words, the acceleration at which the user 110 writes with each word, and the acceleration at which the user 110 moves between written letters and written words. The temporal elements can also include the in-air time ratio of the user 110 with the writing implement 108. The in-air time ratio can correspond to the amount of time the user 110 holds the writing implement 108 in the air verse the amount of time the user 110 holds the writing implement 108 against receiving the receiving device 106. The in-air time ratio can indicate how much time the user 110 spends writing on the receiving device 106 against the amount of time the user 110 spends not writing, which can be an indication of whether the user does or does not understand how to perform the instructed task.

The following list includes each of the temporal features that the feature extraction module 118 can determine. For example, the feature extraction module 118 can determine an initial time, a stroke time, a stroke count, a gap time, a solve time, a total time, a delay features time a thinking time, an average speed, an initial speed, a termination speed, a pause time, a frequency of pauses, a solving order, and a number of times revisiting the question.

The initial time can be considered as reading time, which can be determined as the time duration between a last stroke in the previous question until the first stroke in the current question. The initial time is typically zero for the first question. The stroke time corresponds to the time a user spent writing. The stroke count corresponds to the sum of all strokes when answering the questions of the task. The gap time corresponds to a sum of all delays. The solve time corresponds to the stroke time plus the thinking time. The total time corresponds to the solve time plus the initial time. The delay time features corresponds to a delay of 1, 2, 3, 4, 5, 10, 20, or 30 seconds. The delay time features require adding all of the delays, including the actual values and the counts. The thinking time corresponds to an amount of time required for the user to think to perform the task (e.g., to solve a problem), e.g., 5 seconds for example. The pause time can be a value above 10 seconds, for example. The frequency of pauses can correspond to the value of pauses, such as 10 seconds or 30 seconds, to name a few examples. The solving order can correspond to the order in which the user answers the questions. The number of times revisiting the questions corresponds to the number of times a user revisited a question, which may be helpful in determining the question comprehension metric.

The pressure features can include characteristics of the pressure recorded between the tip of the writing implement 108 and the receiving device 106. Both the writing implement 108 and the receiving device 106 may provide pressure data. The pressure data may be recorded in Pascals (PA), for example. The knowledge server 104 can extract various pressure representations from the input data. For example, the various pressure representations can include a change in pressure over time, the average or mean pressure, the maximum mean pressure, and the speed of the pressure. The change in pressure over time can illustrate an amount of pressure applied by the user 110 at different time units, such as 1 PA at 1 second, 2 PA at 2 seconds, 2 PA from 3 seconds through 20 seconds, and 1 PA at the 21-second mark. The average or mean pressure can indicate that the user 110 applied an average of 2 PA over the entire attempt. The speed of the pressure can correspond to a rate of change between the pressure amounts.

The tilt features can correspond to the characteristics of the tilt of the writing implement 108. For example, the tilt features can include the mean or average tilt of the writing implement 108, the maximum tilt of the writing implement 108, a speed of the tilt of the writing implement 108 in the X direction, and a speed of the tilt of the writing implement 108 in the Y direction. The tilts can be measured from a frame of reference, such as at 0 degrees, the writing implement 108 is completely vertical and at 90 degrees, the writing implement 108 is parallel to the receiving device 106.

The textual features can correspond to the characteristics of the written letters and numbers with the writing implement 108. For example, the textual features can correspond to optical character recognition (OCR) results of the written letters and numbers. In some implementations, the computing system 102 can perform the OCR functions. In other implementations, the knowledge server 104 can receive the characteristics of the written letters and numbers and perform OCR to generate the textual features. The textual features can also include a time stamp indicating when the handwritten text was written with the writing implement 108.

The feature extraction module 118 can also generate other features as well. These other features can include, for example, score and points. The score can correspond to the maximum number of points for the questions. The points can correspond to the points awarded to the user for each question.

In some implementations, the feature extraction module 118 can generate each of the spatial, temporal, pressure, textual, and tilt features for a set period of time. For example, if the amount of time taken by user 110 to perform the task took five minutes, then the feature extraction module 118 can generate a set of features, e.g., spatial, temporal, pressure, and tilt features, every 10 seconds. In this example, the feature extraction module 118 can generate 30 feature sets for the entire 5-minute period. In some examples, the feature extraction module 118 can generate one set of features for the entire five-minute period. By generating periodic features over a set amount of time taken by the user 110 to perform the task, the knowledge server 104 can analyze the user 110's writing behavior in chunks, and ultimately, monitor how the user 110's behavior and cognitive abilities evolve as the user 110 performs the task.

During stage (D), the knowledge server 104 provides the cognitive module 120 and the behavior module 122 with various inputs. These various inputs can include the modalities of system 100. The modalities can include, for example, environmental data 107, the extracted features from the feature extraction module 118, and test question data 109 from the package 114. The modalities can be audio data, video data, the input data, and feature data. Additionally, the knowledge server 104 provides each of the extracted features, e.g., spatial, temporal, pressure, tilt, and textual features, to both the cognitive module 120 and the behavior module 122. In some cases, the knowledge server 104 can provide a set of each of the extracted features to the cognitive module 120 on a periodic basis. Continuing with the example from above, if the feature extraction module 118 generates 30 feature sets for the entire 5-minute period, the knowledge server 104 can provide one set from the 30 feature sets at a time. By combining and providing these modalities as input to both the cognitive module 120 and the behavior module 122, the cognitive and behavioral metrics become more accurate and reliable.

In some implementations, the user 110 may interact with a user interface of the computing system 112 to perform the task instructed during stage (A) without the use of the writing implement 108. For example, the user 110 may interact with a keyboard, a mouse, or a touchscreen of the display 112 or the receiving device 106. In other examples, the user 110 may write with a pen, a pencil, or another preferred form of writing that does not have recording capabilities on the receiving device 106 as the user 110 performs the task. In this case, the computing system 102 can use different modalities, e.g., audio, video, movement data, to track and monitor the user 110 as he/she performs the task. In particular, the computing system 102 can monitor the user 110 using techniques such as facial detection, object detection, classification, and other tracking techniques. In some implementations, the receiving device 106 can be the source of the input data when the user 110 interacts with the receiving device 106. For example, the user 110 can write on a tablet display, e.g., receiving device 106, with a stylus, finger, or another device as a form of input. The computing system 102 can then provide these recorded modalities along with the test question data and the input data without the use of the writing implement 108 to the knowledge server 104 over network 116 to perform feature extraction and the continuing processes.

The knowledge server 104 can include a cognitive module 120 and a behavior module 122. The cognitive module 120 and the behavior module 122 include a set of metrics that measure a performance of the user, such as user 110, and others. Both modules 120 and 122 can be used as a toolset to help measure, determine scores, and improve the cognitive and behavioral abilities of user 110 using the determined scores. For example, the cognitive module 120 can determine a number sense metric, a reasoning metric, a memory visual metric, and an apply/connections metric. The behavior module 122, for example, can determine a test taking skill metric, a grit metric, a concentration metric, and a question comprehension metric. The knowledge server 104 can indicate cognitive and behavioral abilities of the user 110 with each of these metrics.

In some cases, the knowledge server 104 can determine these metrics for the user 110 just by the manner in which the user 110 writes with the writing implement 108. Then, the knowledge server 104 can indicate to the user 110 or to another individual supervising user 110 a performance of the user 110 to help identify areas in which the user 110 is weak or needs additional assistance. The benefit of system 100 is that, as will be further described below, based on identifying areas in which the user 110 has low metrics, the knowledge server 104 can generate recommendations to improve the user 110 cognitive and behavioral availabilities in these low metrics.

Both of the cognitive module 120 and the behavior module 122 can determine the number of questions in the task, the number of questions the user 110 answered correctly, and the number of questions the user answered incorrectly from the test question data 109 and the input data 105. These modules (120 and 122) can use these results to further calculate their respective metrics, as discussed below.

During stage (E), the cognitive module 120 can determine metrics for the user 110 based on the environmental data 107, the test question data 109, and the extracted features from the feature extraction module 118. These metrics can include number sense, memory visualization, reasoning, and apply/connections. The number sense metric can correspond to a user's flexibility of thoughts, flexibility in calculation, and an openness of numbers. For example, the number sense metric can indicate how adaptive is user 110 at performing tasks that involve looking at number problems from different points of view.

The memory visualization metric can indicate an ability of the user 110 to mentally visualize portions of the task, to visualize pattern recognition, and to focus on memorization skills. The memory visualization metric can be measured by how quickly the user 110 is able to correctly recall key concepts, formulas, patterns, and other problem solving tactics. The memory visualization metric can also be determined from reading comprehension problems, where the memory visualization metric can indicate how quickly a user can recognize a type of argument, the argument's conclusion, and one or more other features, such as an argument's assumption. The equation illustrated below corresponds to one example implementation of how the memorization visualization metric is calculated:

$$\text{Memorization} = \sum \text{Memorization Weight} * \text{Correctness} * \left(\frac{\text{Average resolve time}}{\text{student solve time}}\right) * \left(\frac{\text{Question Mark}}{\text{Total Assessment Mark}}\right) \text{OR difficulty} \quad (1)$$

In equation 1, the memorization weight corresponds a value between 0 and 1 or 0 and 100 for each specific question. The correctness corresponds to a 1 or 0 indicating whether the user answered the question correctly. The average resolve time corresponds to a time in seconds indicating how long it takes the average person to solve the question. The student solve time corresponds to a time in seconds indicating how long it takes the student to solve the question. The question mark can correspond to a weight value for the question and the total assessment mark can correspond to a weight value for each of the questions in the assessment. The difficulty can correspond to a value of difficulty of the question.

The cognitive module 120 can determine the reasoning metric. The reasoning metric can measure an ability of the user 110 to critically think, execute logic on paper and even mentally, and execute problem-solving skills. The reasoning metric can also measure an ability of the user to develop responses in a creative manner to challenging problems. For example, the reasoning metric can measure the ability of user 110 to think through the solution to each component of a particular task in a logical manner. The equation illustrated below corresponds to one example implementation of how the reasoning metric is calculated:

$$\text{Reasoning} = \sum \text{Reasoning Weight} * \text{Correctness} * \left(\frac{\text{Average resolve time}}{\text{student solve time}}\right) * \left(\frac{\text{Question Mark}}{\text{Total Assessment Mark}}\right) \text{OR difficulty} \quad (2)$$

In equation 2, the reasoning weight corresponds a value between 0 and 1 or 0 and 100 for each specific question. The correctness corresponds to a 1 or 0 indicating whether the user answered the question correctly. The average resolve time corresponds to a time in seconds indicating how long it takes the average person to solve the question. The student solve time corresponds to a time in seconds indicating how long it takes the student to solve the question. The question mark can correspond to a weight value for the question and the total assessment mark can correspond to a weight value for each of the questions in the assessment. The difficulty can correspond to a value of difficulty of the question.

The cognitive module 120 can determine an apply/connections metric. The apply/connections metric can reveal user 110's ability to connect abstract concepts and apply these connected abstract concepts to perform the task. The apply/connections metric can extend from conceptual understanding to applying association skills, which are reflected in the manner in which the user 110 writes with the writing implement 108. The equation illustrated below corresponds to one example implementation of how the apply/connections metric is calculated:

$$\text{Apply/Connections} = \sum \text{Connections Weight} * \text{Correctness} * \left(\frac{\text{Average resolve time}}{\text{student solve time}}\right) * \left(\frac{\text{Question Mark}}{\text{Total Assessment Mark}}\right) \text{OR difficulty} \quad (3)$$

In equation 3, the connections weight corresponds a value between 0 and 1 or 0 and 100 for each specific question. The correctness corresponds to a 1 or 0 indicating whether the user answered the question correctly. The average resolve time corresponds to a time in seconds indicating how long it takes the average person to solve the question. The student solve time corresponds to a time in seconds indicating how long it takes the student to solve the question. The question mark can correspond to a weight value for the question and the total assessment mark can correspond to a weight value for each of the questions in the assessment. The difficulty can correspond to a value of difficulty of the question.

The cognitive module 120 can generate a score for each of these metrics. The score can correspond to a percentage between 0 and 100, or a number between 0 and 1. The scores can be based on the number of questions posed, the number of questions the user 110 answered correctly, the number of questions the user 110 answered incorrectly, and values from the one or more extracted features.

For example, the cognitive module 120 may determine the value of the number sense metric based an amount of time taken to perform the task, the average speed of the writing implement 108 by the user 110, and the performance of the user 110. The performance can correspond to the number of questions answered quickly divided by the number of total questions in the task. As illustrated in system 100, two questions exist and the user 110 has answered two questions correctly for a performance score of 1 or 100%. If the user 110's performance is high, average speed of writing is high, and the amount of time taken to perform the task is low, then the cognitive module 120 can determine the value of the number sense metric to be a high number, such as 90%, for example. If the user 110's performance is low, average speed of writing is medium to low, and the amount of time taken to perform the task is high, then the cognitive module 120 can determine the value of the number sense metric to be a low number, such as 20% for example.

The cognitive module 120 may determine the value of the memory visualization metric by determining a difference between a time when user 110 is first shown a problem of the task to a time when the user 110 presses the writing implement 108 to the receiving device 106 to initiate performing the task. The cognitive module 120 can then determine the memory visualization metric based on this difference value and the performance value of the user 110. The difference value can indicate how well the user 110 has memorized a portion of the solution or the solution itself. If the user has memorized the solution, then the difference value will be very small. Thus, if the difference value is small and the performance of the user is high, then the cognitive module 120 can indicate that the memory visualization metric is high for user 110.

The cognitive module 120 can determine the value of the reasoning metric based on the total time taken to perform the task, the performance of the user 110, and an indication of the question that required reasoning. If the total time taken to perform the task is low and the performance of the user 110 is high, then the cognitive module 120 can indicate that the user 110's reasoning metric is high.

The cognitive module 120 can determine the value of the apply/connections metric based on a length of each stroke, the total time taken to perform the task, and the performance of the user 110. If the total time taken to perform the task is low and the performance of the user 110 is high, then the cognitive module 120 can indicate that the user 110's apply/connections metric is high. Moreover, if the length of each of stroke is longer, this may indicate that the user 110 is thinking about the answer because he is unsure of the answer. If the stroke length is short, this may indicate that the user is confident of the answer because the user desires to perform the task with haste.

In some implementations, the cognitive module 120 can indicate a value for each metric from the number sense, memory visualization, and apply/connections. Not only does the cognitive module 120 determine values for each of these metrics, but also the implication of these values provides a measurement of the user 110's cognitive abilities. Should user 110 have high reasoning and memory visualization metrics but low number sense and apply/connections metrics, the knowledge server 104 can provide recommendations to user 110 to improve their mathematical studies as their reading and vocabulary understanding is high. Other analyses can be determined and recommendations provided, as further discussed below.

During stage (F), the behavior module 122 can determine metrics for the user 110 based on the environmental data 107, the test question data 109, and the extracted features from the feature extraction module 118. These metrics can include test taking skills, grit, concentration, and question comprehension. The test taking skill can correspond to an ability of a user to create strategies, understanding time management, and having self-awareness, each of which being measured while performing the task. The ability to skillfully manage test taking time and handle the pressures associated with the performing the task.

The grit metric can indicate a persistence and ability to deal with difficult questions (or questions that the user 110 deems difficult) without giving up on performing the task. Moreover, the grit metric can indicate an ability to persevere through challenging and high-effort problems on an assessment such as an instructed task. Generally, the grit metric can indicate which users may perform the best in performing the task because these users typically strive to persevere through to the solution, whereas other users may give up. Grit may also indicate a tendency to sustain interest in and effort towards your goal, e.g., the adage "whatever it takes to improve, can be used to define the grit metric. In essence, how much a user persists through questions that are deemed challenging by looking at a performance of the user based on, for example, an amount of time taken to solve the most difficult questions and the number of strokes taken to solve the problem. Likewise, users with high grit scores can maintain a level of interest and effort towards achieving a goal despite challenges and failures in the process of meeting that goal. Thus, a user with a high grit score may spend more time and use more pen strokes on difficult questions.

The concentration metric can indicate an ability of a user to focus without taking numerous pauses through the assessment and responding quickly to questions. The concentration metric can aid in determining which users can focus on the task without being persuaded by other tasks. This metric also relates to positive metrics, where the user can focus on problem solving instead of worrying about other external factors not related to performing the task.

The question comprehension metric can indicate an ability of a user to understand and communicate issues with self-control. Moreover, the question comprehension metric can indicate an ability to quickly and correctly understand the facts presented in a problem and formulate a solution to the instructed task. If a user is given a task with a long instruction, the question comprehension metric can indicate how well the user understood the long instruction based on the user's solution and the manner in which the user performed the task.

Similar to the cognitive module 120, the behavioral module 122 can generate a score for each of its metrics. Each score can correspond to a percentage between 0 and 100, or a number between 0 and 1. The score can be based on the performance of the user (which can include the number of questions answered correctly and incorrectly), the number of questions requested to be answered, and values from the one or more extracted features.

For example, the behavior module 122 can determine the value of the test taking skills metric based on a speed rate of the user 110's movement of the writing implement 108, an amount of time taken to perform the task, an amount of ink deposited by the writing implement 108 at the receiving device 106, and a performance of the user 110. If the behavior module 122 determines that these values are high, then the behavior module 122 can determine the test taking skills metric to be of a high value, e.g., 85%. A high test taking skills metric can indicate that the user 110 has a strong tendency to create strategies, have self-awareness, and comprehends time management while performing the task.

The behavioral module 122 can determine the value of the grit metric based on a length of each stroke with the writing implement 108, an amount of time taken to perform each stroke with the writing implement 108, a writing speed of the writing implement 108, a speed of the writing implement 108 before the user performed the task, and the performance of the user 110. The speed of the writing implement 108 can correspond to how quickly the user 110 moved the writing implement 108 to the receiving device 106 upon reading the instructed task. A fast movement may indicate that the user 110 has the desire and perseverance to perform the task.

In some implementations, the behavior module 122 may determine the grit metric using a particular equation. For example, the equation below (equation 4) may be the following:

$$\text{Grit Metric} = \text{Perseverance} * \frac{\text{\#Questions Right}}{\text{Total Questions}} + \text{Resilience} * \frac{\text{\#Questions Wrong}}{\text{Total Questions}} \tag{4}$$

In equation 4 above, the behavior module 122 can determine the grit metric by multiplying a perseverance score by the performance of the user 110. The performance of the user 110 can correspond to the number of questions the user 110 answered correctly divided by the total number of questions. The behavior module 122 may determine the perseverance score of the user 110 by analyzing one or more extracted features, such as the speed of the user 110's movement with the writing implement 108, the change in speed of the user 110's movement with the writing implement 108 as the user 110 performs the task, and the performance of the user 110. The perseverance score is applied to the grit on the correct questions and resilience applies the same equation, equation 4, on questions that were incorrectly calculated. The resultant value of the perseverance score multiplied by the performance is added to a resilience score multiplied by a particular factor.

$$\text{Grit Metric} = \sum_{k=1}^{n} \text{diff}_k * \text{correctness}_k * (\text{stroke count}_k + \text{total time}_k + \text{ink length}_k) \tag{5}$$

In equation 5 above, illustrates a different equation to calculate the grit metric from equation 4. For example, the $\text{diff}_k$ corresponds to the difficulty level of a question k, such that each level has a particular weight. For example, $\text{diff}_k$ can be a value of 0.1 for an easy question, 0.2 for a medium question, and 0.7 for a hard question. The $\text{diff}_k$ can use other values as well. The $\text{correctness}_k$ value can correspond to a Boolean value, either 0 or 1. In other examples, the $\text{correctness}_k$ value can correspond to other values. The $\text{stroke count}_k$ can correspond to the number of strokes performed in equation k. The $\text{total time}_k$ can correspond to the total time spent to solve a question k. The $\text{ink length}_k$ can correspond to all strokes which are combined to form a continuous length for each question k. In some examples, the grit score can rely on the calculation of a z-score using the combination of $\text{stroke count}_k$, $\text{total time}_k$, and $\text{ink length}_k$.

The behavior module 122 can determine the resilience score and multiply that value by the number of questions the user 110 answered incorrectly divided by the total number of questions. The behavior module 122 can determine the resilience score in a similar manner to how the perseverance score is determined, such as by analyzing the speed of the user 110's movement with the writing implement 108, the change in speed of the user 110's movement with the writing implement 108 as the user performs the task, the performance of the user 110, and an amount of digital ink deposited by the writing implement 108 on the receiving device 106. Thus, when the behavior module 122 adds the perseverance score times the performance of the user 110 with the resilience score times the number of questions the user 110 answered incorrectly divided by the total number of questions, the behavior module 122 can generate a grit score.

The behavior module 122's determination of the grit score is a strong indication of how well a user 110 will perform on tasks. For example, in an educational context and as will be illustrated below, students who achieved high grit scores are typically students who received the highest exam scores. Even when students answered questions incorrectly, these students did not give up and exerted more effort, these students appeared to answered more questions quickly overtime due to their resilience and perseverance. The combination of perseverance and resilience creates a grit score that together can help identify which users are willing to put in the effort to perform the task.

In some implementations, the behavioral module 122 determines the value of the concentration metric based on a stroke gap time, a count of long pauses, a writing speed, an initiation speed, and the performance of the user 110. The stroke gap time can correspond to a total sum of time gaps between strokes made by the user 110 with the writing implement 108 when writing is not in progress. The time gap can correspond to a length of time measured between each written letter in a word or between two letters of two different words. If the stroke gap time is high, this may indicate that much deliberation has occurred when performing the task. The count of long pauses can correspond to the total number of long deliberations made by user 110 when performing the task. The count of long pauses value may be high when the number of long deliberations is small and the value is low when the number of the deliberations is small. The writing speed can correspond to the speed of the movement of the writing implement 108 when the user 110 is performing the task. The writing speed can indicate not only the speed at instantaneous times but also the difference in speed during times in which the user 110 is answering each question or equation of the task. High values of writing speed are typically correlated with high performance and confidence or concentration in user 110's performance of these tasks. The initiation speed can correspond to the speed of the writing implement 108 when the user 110 moved the writing implement 108 to the receiving device 106 upon reading the instructed task. This initiation speed can indicate the speed of understanding the question and the initiation of the question answering. A high initiation speed can indicate that the user 110 is familiar and confident about performing the task.

The behavioral module 122 can determine the value of the question comprehension metric based on an initial time to start performing the task, a re-work indication, and the performance of the user 110. The initial time to start performing the task can indicate an amount of time taken by user 110 to start writing with the writing implement 108 from a time at which the user 110 is shown the task. The re-work indication can correspond to whether the user has rewritten another solution to the same task or whether the user has erased old work with the writing implement 108 before selecting or entering an answer to a question of the task. For example, if the re-work indication is set, this can indicate that the user 110 may not comprehend the question being asked. The performance of the user 110 corresponds to the number of questions the user 110 answered right divided by the total number of questions in the task.

In some implementations, the behavior module 122 provides a behavioral measurement of the user 110's abilities. If the behavior module 122 determines that the user 110 has a high grit and a high concentration metric with low test taking skills and question comprehension metrics, the knowledge server 104 can provide recommendations to the user 110 (or a supervisor of user 110) to improve their test taking skills. The behavior module 122 can indicate that the user 110 is willing to work hard in performing tasks but may not have enough experience in test taking and comprehending questions, thus, the user 110 may just not more practice in these question types.

During stage (G), the cognitive module 120 and the behavior module 122 provide each of their metrics to the generate profile module 124. The generate profile module 124 can generate a data structure that can include each of the metrics from the cognitive module 120, e.g., number sense metric, memory visualization metric, reasoning metric, and apply/connections metric, and the behavior module 122, e.g., test taking skills metric, grit metric, concentration metric, and question comprehension metric. The generated user profile defines characteristics of user 110 based on the metrics from the cognitive module 120 and the behavior module 122. For example, the data structure can include a tuple, a data struct, a vector, an array, and the like. The generate profile module 124 can associate this data structure with the credentials provided by the user 110, e.g., username and password, to the computing system 102 before performing the task. The knowledge server 104 may use the credentials along with the stored metrics in the data structure to identify and verify the authenticity of the user's credentials. In some implementations, the data structure can include other data, such as features that indicate characteristics of the user's writing behavior, e.g., spatial features, temporal features, pressure features, textual features, or tilt features. In some examples, the data structure can include data indicative of a user's writing behavior with respect to a specific series of characters, as discussed further below.

For example, as illustrated in system 100, the generate profile module 124 generates a user profile 111 of the user 110. The user profile 111 can include the credentials of the user 110 along with each of the metrics from the cognitive module 120 and the behavior module 122. Collectively, the cognitive module 120 and the behavior module 122 determined a grit metric of 75%, a number sense metric of 60%, a reasoning metric of 30%, a memory visualization metric of 50%, an apply/connections metric of 80%, a test taking skills metric of 70%, a concentration metric of 80%, and a question comprehension metric of 100%.

During stage (H), the knowledge server 104 can provide the user profile 111 to the comparison module 126. The comparison module 126 can compare data from the user profile 111 to the data stored in the user profiles database 130 to identify the user 110 writing with the writing implement 108 and verify the authenticity of the user 110. The user profiles database 130 can include one or more tables of data representing credentials along with cognitive and behavioral metrics associated with previous users. For example, the user profiles database 130 can include multiple user profiles, each profile associated with a set of cognitive and behavioral metrics, features indicative of characteristics of the user's writing behavior, or other data about the user.

In some cases, the user profiles database 130 includes multiple user profiles for the same user. A user, such as user 110, may have 100 user profiles in the user profiles database 130, for example. Each profile can illustrate different instances when user 110 performed a task and the resultant cognitive and behavioral metrics associated with the respective task. Each profile of the same user will contain the same user credentials. By having multiple user profiles, the knowledge server 104 can monitor the learning of user 110. The learning can illustrate, for example, that the user 110's grit has improved over time, the number sense has remained the same, the memory visualization has increased, the apply/connections has decreased over time, the test taking skills have increased, the concentration has increased, and the question comprehension metric has decreased over time, to name some examples. The learning can also illustrate other patterns besides changes over time. This can include learning that shows the user 110, for example, has high grit, concentration, and reasoning metrics when solving algebraic equations, but the user 110's question comprehension, memory visualization, and apply/connection metrics are low when answering reading comprehension questions. In other implementations, the user profiles database 130 may store a single user profile for each user. Each user profile can then store the user credentials and the cognitive and behavioral metrics associated with each task for that user over a period of time. By monitoring the learning of each user, the knowledge server 104 can track whether a user has improved or regressed his scores, e.g., the cognitive and behavioral metrics, over time. The knowledge server 104 can tailor recommendations to provide to the user depending on whether the user has a learning setback, e.g., regression, or if the user is in fact improving his/her learning, for example.

In some implementations, the user profiles database 130 stores other data associated with each user profile. This other data can include the corresponding input data, environment data, test question data, and extracted feature data. In this manner, the knowledge server 104 can make other connections about the cognitive and behavioral metrics, such as direct correlations between question types, e.g., math, verbal, and reading comprehension, with particular metrics. Additionally, the knowledge server 104 can determine, with the use of metrics, which areas the users excel or are weak and require additional practice. The knowledge server 104 can determine how users improve or decline associated with particular question types.

The comparison module 126 can compare the user profile 111 to each of the stored user profiles in the user profiles database 130. For example, the comparison module 126 may first perform a search on the user profiles and to search for any user profiles that have matching credentials to the credentials found in the user profile 111. If no profiles exist that have matching credentials, then the knowledge server 104 can indicate to the computing system 102 that this is the first time user 110 has used the writing implement 108, the receiving device 106, and the computing system 102. On other hand, if one or more profiles do exist that have matching credentials, then the comparison module 126 can take an additional process to verify the user 110 is who they say they are. This additional process can ensure that no user cheats by having another user perform a task that appears to be being performed by the user associated with the supplied credentials.

The comparison module 126 can identify the one or user profiles that have matching credentials to the credentials found in the user profile 111. Then, the comparison module 126 can compare each metric found in the user profile 111 to the metrics found in the identified one or more user profiles. To deem a match, the comparison module 126 can determine the values must be within a predetermined value of one another. This predetermined value can be 5%, 10%, or 15%, depending upon a value set by an implementer of system 100. The lower the predetermined value, the higher the accuracy of system 100. However, there is a chance that a very low predetermined value may make the system 100 inaccurate, in the event that a user is misidentified. For example, if the predetermined value is 1%, then the system 100 may not identify a user 110 with a previous user profile, especially in the case that the user 101 has made drastic improvements with their metrics over a period of time. Thus, the comparison module 126 can also identify a generation date associated with a matching user profile to ensure the comparison module 126 accurately identifies a particular user to previously generated user profile. For example, if a generation date of a previous user profile is within a predetermined threshold of the current date when user profile 111 is generated, and the metrics between the previous and current user profile are within a threshold, the comparison module 126 can deem a match exists.

During stage (I), if the comparison module 126 determines that metrics in the user profile 111 do not match to one or more identified user profiles with the correct credentials, the knowledge server 104 can store a new user profile in the user profiles database 130. The new user profile can include the user 110's credentials, data from the package 114, e.g., the test question data, environmental data, and input data, and the metrics determined in the user profile 111. At a later point in time, the comparison module 126 can scan through the user profiles database 130 and search for the newly inserted user profile.

In some implementations, the user profiles database 130 can make any of the values stored searchable. For example, if the knowledge server 104 received a request to return all users with grit scores above 90%, the knowledge server 104 can perform a search in the user profiles database 130 to return all user profiles with grit scores above 90%. These results can include multiple user profiles associated with a single user, in the case that a user performed multiple tasks, and in each task, the knowledge server 104 determined that the user applied a grit of above 90%. Other parameters can be searched, such as question types, data associated with feature extraction, and device identification. For example, a user, such as a teacher, may request to search for all users who used a particular writing implement and correlate those results with users who performed similar tasks with a different writing implement. This may help identify to the teacher if a writing implement may not be working correctly or whether the tasks are too difficult or easy across all users who use system 100.

The systems 100 and 101 may work in other environments different from educational environments. For example, the systems 100 and 101 may work in medical environments. In a medical environment, the user 110 may be a patient at a hospital. The computing system 102 can instruct the patient to write a particular phrase with the writing implement 108 on the receiving device 106. The knowledge server 104 can perform stages similar to those defined in systems 100 and 101. Additionally, the knowledge server 104 can obtain heart rate data, skin temperature, and other medical readouts of user 110 from the writing implement 108 and use this medical information along with the extracted features and the cognitive and behavioral metrics to make medical determinations.

For example, the knowledge server 104 may be able to use this information to detect early stage Alzheimer's detection, e.g., by way of long pauses of writing words or odd writing patterns. Additionally, the knowledge server 104 may be able to detect other medical ailments such as, Parkinson's disease, e.g., by way of a shaky hand while writing, and cognitive aging. In some cases, these medical detections may be determined in not just a medical environment, but in normal environments, and the knowledge server 104 can indicate to a particular individual, e.g., user 110, that they are exhibiting characteristics associated with early stage Alzheimer's detection. Additionally, the systems 100 and 101 may act as a possible lie detector by analyzing skin temperature, heart rate, and a detection that the user is writing in a pattern that deviates from the user's typical writing pattern.

Figure 1B:
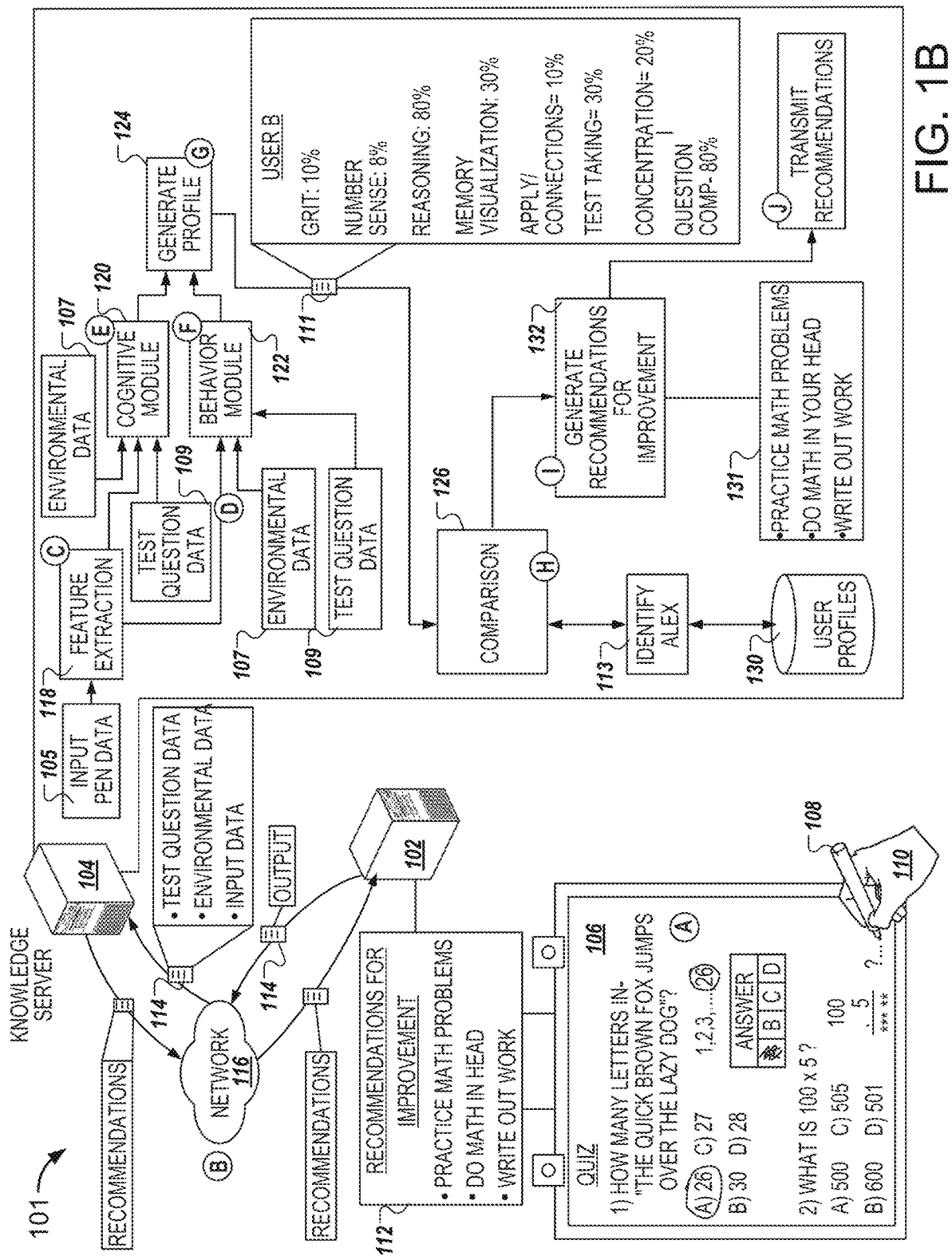
FIG. 1B is another block diagram that illustrates an example of a system for determining cognitive and behavioral metrics of an individual using a writing implement.

FIG. 1B is another block diagram that illustrates an example of a system 101 for determining cognitive and behavioral metrics of an individual using a writing implement. The example of FIG. 1B is similar to FIG. 1A, includes similar components, but applied to different tasks. Similar components between systems 100 and 101 will not be described again. FIG. 1B illustrates various operations in stages (A) through (J) which can be performed in the sequence indicated or in another sequence.

During stage (A), the user 110 is instructed to perform a task. The computing system 102 can provide a task to the user 110 through the display of the receiving device 106 and through the display 112 of the computing system 102. As illustrated in system 101, the task includes two mathematical questions that the user 110 is instructed to answer. The first question asks the user 110 to answer the following questions: "How many letters in 'THE QUICK BROWN FOX JUMPS OVER THE LAZY DOG'?" The second question asks the user 110 the following question: "What is 100×5?" The receiving device 106 can also provide the user 110 with space to write notes to identify the task, write various methods to perform the task, select a potential solution to each task, and write the identified solution to each task.

As illustrated in system 101, the user 110 writes out the solution to the first question with the writing implement 108 by counting the number of letters in the phrase—"1, 2, 3 . . . . 26." Additionally, the user 110 circles the number 26 in his list to identify the answer to the question. Moreover, the user 110 circles "A) 26" to delineate the answer to the first question to the receiving device 106, the writing implement 108, or both, and ultimately, to the knowledge server 104.

The user 110 writes out the solution to the second question with the writing implement 108 by multiplying the number 100 by the number 5. As shown in system 101, the user 110 is not able to come up with the answer and writes dots, indications of where to put the answer, and a question mark to indicate that the user 110 is not able to answer the second question. The receiving device 106, the writing implement 108, or both, and the computing system 102 captures this raw data. The user 110 can indicate that he has completed performing the task with two questions, as he provided an answer to the first question and did not provide an answer to the second question.

During stage (B), the computing system 102 obtains raw data from the writing implement 108 and the receiving device 106. The computing system 102 can generate a package to provide to the knowledge server 104 over network 116. The package 114, as illustrated in system 101, can include test question data, the environmental data, and the input data. In some implementations, the computing system 102 may generate a package 114 on a periodic basis as the user 110 is performing the instructed task and transmit the package 114 to the knowledge server 104 on the periodic basis. In some implementations, the computing system 102 may store the package 114 internally or externally in memory and send a location of the package 114 to the knowledge server 104 for retrieval.

During stage (C), the knowledge server 104 receives or retrieves the package 114 from the computing system 102. In some implementations, the knowledge server 104 can extract the test question data, the environmental data, and the input data from the package 114. The knowledge server 104 can provide the extracted input data 105 from the package 114 to the feature extraction module 118. The feature extraction module 118 can extract a variety of features from the input data. These features can include, for example, spatial features, temporal features, pressure features, textual features, and tilt features, associated with the writing implement 108.

During stage (D), the knowledge server 104 provides the cognitive module 120 and the behavior module 122 with various inputs. These various inputs can include environmental data 107, test question data 109, and each of the extracted features, e.g., spatial, temporal, pressure, textual, and tilt features. The test question data 109 can include data that describes the task to be performed. The environmental data 107 can include data that illustrates an environment around the user 110 while the user 110 performs the task.

During stage (E), the cognitive module 120 generates cognitive metrics for the user 110 using the environmental data 107, the test question data 109, and the extracted features from the feature extraction module 118. These cognitive metrics can include number sense, memory visualization, reasoning, and apply/connections. The cognitive module 120 can determine from the test question data 109 and the input data the number of questions associated with the task and whether the user 110 correctly or incorrectly answered the questions in the task.

During stage (F), the behavior module 122 generates behavioral metrics for the user 110 using the environmental data 107, the test question data 109, and the extracted features from the feature extraction module 118. These behavioral metrics can include test taking skills, grit, concentration, and question comprehension. The behavioral module 122 can also determine from the test question data 109 and the input data the number of correct and incorrect questions the user 110 answered from the task.

During stage (G), the cognitive module 120 and the behavior module 122 provide each of their determined metrics to the generate profile module 124. The generate profile module 124 can generate a data structure that can include each of the metrics from the cognitive module 120, e.g., number sense metric, memory visualization metric, reasoning metric, and apply/connections metric, and the behavior module 122, e.g., test taking skills metric, grit metric, concentration metric, and question comprehension metric. The generate profile module 124 can also include the credentials of user 110 with this generated data structure. The generated data structure or generated user profile 111 is associated with the user 110. Moreover, the generated data structure or generated user profile 111 defines characteristics of the user 110. For example, the generated user profile 111 can include a grit metric of 10%, a number sense metric of 8%, a reasoning metric of 80%, a memory visualization metric of 30%, an apply/connections metric of 10%, a test taking skills metric of 30%, a concentration metric of 20%, and a question comprehension metric of 80%. These numbers are indicative of the user 110 performing the instructed task. For example, the user 110 was not able to figure out question 2, and consequently, the cognitive module 120 determine the number sense metric, the concentration metric, and the apply/connections metric to each be very low.

During stage (H), the knowledge server 104 provides the generated user profile 111 to the comparison module 126. The comparison module 126 can compare the data from the generated user profile 111 to the data stored in the user profiles database to identify the user 110 and verify the authenticity of the user 110. As illustrated in system 101, the comparison module 126 identified the user 110 to be Alex based on the comparison of the user 110's supplied credentials and the comparison of the generated metrics in user profile 111 to various metrics in the user profiles database 130. The comparison module 126 can retrieve one or more user profiles 113 associated with Alex that show various metrics for each task performed by Alex, e.g., user 110. By identifying the user 110 as being Alex, the knowledge server 104 can determine with certainty that the user 110 is in fact Alex and not another user pretending to be Alex.

During stage (I), the knowledge server 104 generates one or more recommendations to provide to Alex, e.g., user 110, to improve Alex's performance. For example, as illustrated in system 101, the knowledge server 104 generates recommendations 131 that include "Practice Math problems," "Do Math in Your Head," and "Write out your work." The knowledge server 104 can analyze one or more factors of the generated profile to determine the types of recommendations to provide to the user 110. For example, the knowledge server 104 can determine that the number sense metric, the apply/connections metric, and the concentration metric are allow below a minimum threshold of 50%. If the knowledge server 104 determines that any of these metrics are below a minimum threshold, the knowledge server 104 can obtain a set of recommendations that have been known to address and improve the user's 110 performance with these metrics. For example, the knowledge server 104 can instruct the user to perform additional practice math problems and to practice performing math problems in their head in seeing that the number sense metric is well below the threshold. Additionally, if the knowledge server 104 determines that the question comprehension metric and the memory visualization metrics were below a threshold, the knowledge server 104 can determine that the user should read more books and study using flash cards to improve these features.

In some implementations, if the knowledge server 104 determines that the environment the user 110 is too noisy or loud, the knowledge server 104 recommends the user 110 take actions to reduce the noise. These actions can include, for example, moving to a different location, such as in a different room of the home, turning down or off the television volume, telling others around you to be quiet, adjusting the brightness of the lights, and turning down or off the music. Additionally, the knowledge server 104 can make these recommendations if the user 110 has a low performance and/or at least one of the cognitive and behavioral metrics are low. The goal is that reducing the noise in the environment will ultimately help user 110 perform better.

In some implementations, if the user 110 is working an environment with a supervisor, the knowledge server 104 generates recommendations to provide to the supervisor. For example, a supervisor may log into the computing system 102 using his or her credentials and indicate to the computing system 102 that she will be monitoring multiple users with the writing implement 108 and the receiving device 106. The supervisor may indicate to the computing system 102 the users he or she is monitoring and the credentials for each of those monitored users. In that manner, when the computing system 102 transmits the package 114 to the knowledge server 104, the knowledge server 104 can process the data and generate recommendations to provide to a client device of the supervisor. The knowledge server 104 can indicate that user A needs to practice math problems, user B needs to practice reading comprehension problems, and user C needs to practice logical problems to improve their grit score, to name a few examples. The knowledge server 104 can also generate other recommendations. The other recommendations can indicate to the user, student, or supervisor that the user should change his/her writing approach. This would require writing more slowly and more carefully to arrive at a correct answer.

In some implementations, the knowledge server 104 analyzes a variety of user profiles for a particular user to determine a user's performance over a period of time. For example, the knowledge server 104 can determine how a user's grit score and concentration metrics have increased over the past month. If the knowledge server 104 determines that these metrics have not increased at an acceptable rate, such as a 2% increase for each task, then the knowledge server 104 can generate additional recommendations to focus the user's attention to performing additional practice problems that help improve these metrics.

Additionally, the knowledge server 104 can indicate to the supervisor the actual determined metrics of a particular user. For example, the knowledge server 104 can indicate that the user 110's grit metric has decreased over a period of time or that the user 110's concentration metric has increased over a period of time. This display of data, e.g., such as through a graph or plot, can indicate to the supervisor areas of improvement that need to be applied to a particular user and areas that the user has improved. The knowledge server 104 can also display how the metrics for a particular monitored user or monitored multiple users have changed over a period of time. This information can be important to aid in improving the performance of a user and of improving performances of multiple users.

In some implementations, the knowledge server 104 can monitor and track multiple users over time. As the users use the components shown in systems 100 and 101, the systems 100 and 101 can track the performance of the users, e.g., whether the users have improved or declined in their cognitive and behavioral abilities, over time. In particular, the knowledge server 104 can monitor and track the performance of each user over time to see how the users' performance changes or remains the same over time.

Incrementally, as the knowledge server 104 generates cognitive and behavioral metrics for each user, e.g., as the user performs a task, the knowledge server 104 can generate and provide tailored recommendations to each of the students with the goal of improving their cognitive and behavioral metrics. For example, if the knowledge server 104 determines that the grit score of user 110 is increasing by two points per month, the knowledge server 104 can continue providing tailored recommendations to user 110 that maintain or improve his two-point increase per month. Alternatively, if the knowledge server 104 determines that user 110's grit score is decreasing by three points per month, then the knowledge server 104 can adjust its recommendations because the past tailored recommendations were not effective for that particular user as the user 110 is regressing.

In some implementations, the knowledge server 104 can update each user's profile as each user performs additional tasks. In particular, the knowledge server 104 can update the cognitive and behavioral metrics of the user associated with that user's profile, and perform this process for each user profile. For example, the knowledge server 104 may recalculate each of the cognitive and behavioral metrics based on a moving average each time the user performs a particular task. In another example, the knowledge server 104 can recalculate the cognitive and behavioral metrics on a periodic basis, e.g., weekly, monthly, annually, based on a moving average of the values of the metrics. In another example, the knowledge server 104 can erase the previously determined cognitive and behavioral metrics each time new metrics are calculated so that new metrics are provided each time a user performs a task. Alternatively, the knowledge server can store previous metrics so that the user or a supervisor can view progress of a monitored user, e.g., user 110, over time to determine if the monitored user's progress is slowing, accelerating, or remaining constant. Based on the monitoring of the users and their progress, the knowledge server 104 can generate tailored recommendations for each of the users.

This process of generating tailored recommendations, monitoring users' progress with the cognitive and behavioral metrics, and either refining or regenerating new tailored recommendations is an incremental process that continues over a users' learning period. As the user 110 continues to use system 100, the knowledge server 104 can learn which recommendations work best for a particular user by monitoring the resultant cognitive and behavioral metrics that are created. For example, the knowledge server 104 can generate tailored recommendations for a user over time that focus on improving one, a subset of, or all of the defined cognitive and behavioral metrics.

In some implementations, a supervisor can indicate to the knowledge server 104 which of the cognitive and behavioral metrics that they desire a user to improve. The knowledge server 104 can then generate tailored recommendations that focus specifically on improving the cognitive and behavioral metrics designated by the supervisor. If the knowledge server 104 determines that the recommendations do not appear to be improving the user's cognitive or behavioral metrics over a period of time, then the knowledge server 104 may notify the supervisor of the user, e.g., a parent, a teacher, a boss, a medical worker, or the user themselves, that learning is not taking place.

During stage (J), the knowledge server 104 transmits the generated recommendations 131. For example, the knowledge server 104 can transmit the generated recommendations 131 to the computing system 102, where the computing system 102 displays the generated recommendations 131 on the display 112. As illustrated in system 101, the computing system 102 can display the generated recommendations of "Practice Math Problems," "Do Math in Head," and "Write Out Work." These recommendations or corrective actions can be provided to the user 110 after the user 110 has completed the instructed task. The recommendations can also include an indication of which questions the user 110 answered correctly and incorrectly.

Additionally, the knowledge server 104 can provide the recommendations to a client device of the supervisor monitoring the user 110. In some implementations, the knowledge server 104 can transmit a notification to the client device of the supervisor to indicate to the user that performance metrics have been evaluated and recommendations have been generated. The supervisor can log into a web site hosted by the knowledge server 104 on the cloud network, for example, and the supervisor can access the user profiles for each user the supervisor is monitoring and the recommendations generated for each user. Afterwards, the supervisor can take actions based on the recommendations to tailor the performance improvement for each user and monitor subsequent generated metrics of the user to determine if the actions and recommendations were correct. This process is continuous and can be applied to a user's performance.

In some implementations, the knowledge server 104 employs one or more machine learning techniques to any of the stages (C) through (J). For example, the one or more machine learning techniques may be used to automatically extract features from the input data, generate cognitive and behavioral metrics, generate a user profile, and generate recommendations to provide for the user 110. Moreover, the knowledge server 104 may be able to provide the raw input data into the machine learning techniques, and the machine learning techniques may be able to output structured data, e.g., recommendations to provide to the user 110 to improve their performance. The machine learning techniques may employ automated correlations and algorithms to speed up the process of generating cognitive/behavioral metrics and recommendations.

FIG. 2 is an illustration of an example of input data 200 obtained from a writing implement. For example, the input data 200 may be obtained by the computing system 102 and the knowledge server 104 from the writing implement 108. The writing implement 108 can provide this data in real time to the computing system 102, the knowledge server 104, or to both.

A plurality of strokes, e.g., stroke 1, stroke 2, stroke 3, through stroke N, may be performed on a particular page, e.g., receiving device 106. FIG. 2 illustrates that a user may write on a variety of pages using the writing implement 108 for performing a task with one or more questions. For example, on each page, a stroke may be identified by a continuous trajectory from a point where the tip of the writing implement 108 is in contact with the receiving device 106 to a point where the writing implement 108 has lifted contact from the receiving device 106. Coordinates of the writing implement 108 may specify the strokes during this continuous trajectory at identified time intervals, such as between 0.012 to 0.015 seconds. For example, as shown in system 200, in Stroke 1 on Page:0.329.3244.0.58, the user 110 wrote with writing implement 108 starting at the initial point of (051.94, 053.70) in X, Y coordinates. Moreover, the same Stroke 1 on the same page has a writing pressure of 70 and was provided on Oct. 26, 2017 at 11:13:52:624. The time may be in 24-hour mode, so this time illustrated corresponds to 11:13:52:624 in the morning. Each stroke can correspond to a portion of a letter, the letter itself, and portion of a word if the user 110 writes in a continuous trajectory manner.

Figure 3:
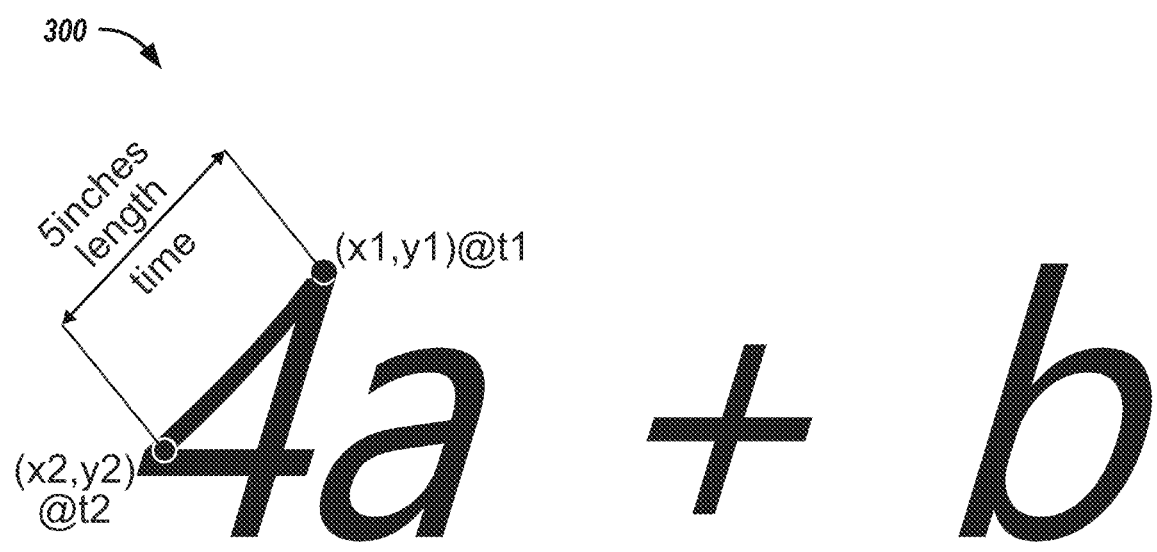
FIG. 3 is an illustration of an approach for generating feature data from input data obtained from a writing implement.

FIG. 3 is a block diagram that illustrates an example of a system 300 for generating feature data from input data obtained from a writing implement. As illustrated in system 300, the user 110 has written the algebraic equation of "4a+b". The knowledge server 104 can analyze the raw data and extract features from the written representation of "4a+b".

For example, the knowledge server 104 can consider raw input as points in the two-dimensional Euclidean plane from the collected input data extracted from the package 114. The points in the two-dimensional Euclidean plane can correspond to stroke positions and time stamps. The knowledge server 104, and in particular, the feature extraction module 118 can apply a Cartesian geometric formula to calculate the distance and speed of the user 110's movement with the writing implement 108, thereby creating feature values to be used by the cognitive module 120 and the behavior module 122. As an example, the feature extraction module 118 can calculate distance and speed using the two stroke points (x1, y1) and (x2, y2) shown in system 300.

The distance of a stroke may be calculated between the two stroke points (x1, y1) and (x2, y2) using the following equation (6):

$$\text{length} = \sqrt{(x_2-x_1)^2+(y_2-y_1)^2} \tag{6}$$

The feature extraction module 118 can calculate the time between two stroke points using the following equation (7):

$$\text{time duration} = t_2 - t_1 \tag{7}$$

The feature extraction module 118 can determine the speed of the user 110's movement with the writing implement 108 by performing the following equation (8):

$$\text{speed} = \frac{\sqrt{(x_2-x_1)^2+(y_2-y_1)^2}}{t_2-t_1} \tag{8}$$

In some implementations, the feature extraction module 118 can determine other features as well. For example, the feature extraction module 118 can determine delay time by the difference in time stamps between the last stroke of one character and the first stroke of a subsequent character. The feature extraction module 118 can determine count of pauses in the raw input of specific durations by counting the number of time intervals during which no stroke is inputted. The feature extraction module 118 can determine the length of input by summing the length of the strokes of all characters inputted by the user. Additionally, the feature extraction module 118 can determine whether the user 110 is performing rework by determining a movement exists with the writing implement 108 in the negative x-axis and/or negative y-axis direction.

The feature extraction module 118 can also calculate the number of all strokes, e.g., total stroke, extractable from input data and calculate a total time of use of the writing implement 108 by the user, e.g., total time. A total time of use of the writing implement 108 by the user 110 for at least one question of a task may include a time when the user 110 reads and deliberates on the at least one question after it is presented, e.g., introduction time, and a time when the question is actually answered with the writing implement 108, e.g., solving time. The feature extraction module 118 can also calculate the time when the user 110 reads and deliberates on the question, e.g., introduction time, and the time when the question is actually answered, e.g., solving time. Moreover, the time from a writing implement 108 being pulled away from the receiving device 106 of the last stroke of the answer to the previous question to a writing implement 108 contacting the receiving device 106 for the first stroke of the answer to the next question may be defined as the deliberation time, e.g., introduction time.

In some implementations, the feature extraction module 118 tracks coordinates of points forming each stroke. If the coordinate values of the points stay substantially the same for a predetermined time period, the feature extraction module 118 can determine that a timing delay has occurred. In addition, the feature extraction module 118 may calculate a total time of delays and the number of delays in associated with at least one question from the task for user 110. The predetermined time period can be for example, one second, two seconds, three seconds, etc. Different weights may be applied depending on the length of the predetermined time. Thus, the feature extraction module 118 can calculate a total time and the number of delays.

With analysis of the raw data, the feature extraction module 118 can determine with at least one question, stroke-drawing speed, e.g., stroke velocity in cm/second, initial speed of a stroke, ending speed, average speed, solving speed, which is the number of strokes per question divided by a solving time per question. Additionally, the feature extraction module 118 can calculate the sum of total length of strokes, e.g., ink length, area used for answering the question, complexity in directions of solving progression, e.g., entropy, cross-out, number of problems attempted, number of changes in question solving order, time taken to start answering the next question when the order of question answering has changed, e.g., out of order time.

For example, the area used for performing a task, e.g., area, may be calculated to be the area where strokes are present. Complexity in directions of solving progression, e.g., entropy, may be calculated by determining that a stroke moving from left to right or from top to bottom is of low entropy and, in contrast, a stroke going from right to left or from bottom to top is of high entropy. Cross-out may be traced by dividing the result into cross-out of a number or a word, such as a typo cross out, crossing out part of a problem solving process, and crossing out of the entire solving or an area corresponding. The problem attempted may be calculated to be the number of times when a question is attempted over a particular time period. The number of changes in question answering order, e.g., out of order variable, may be determined by tracking when the user 110 skips a question to answer another question.

Figure 4:
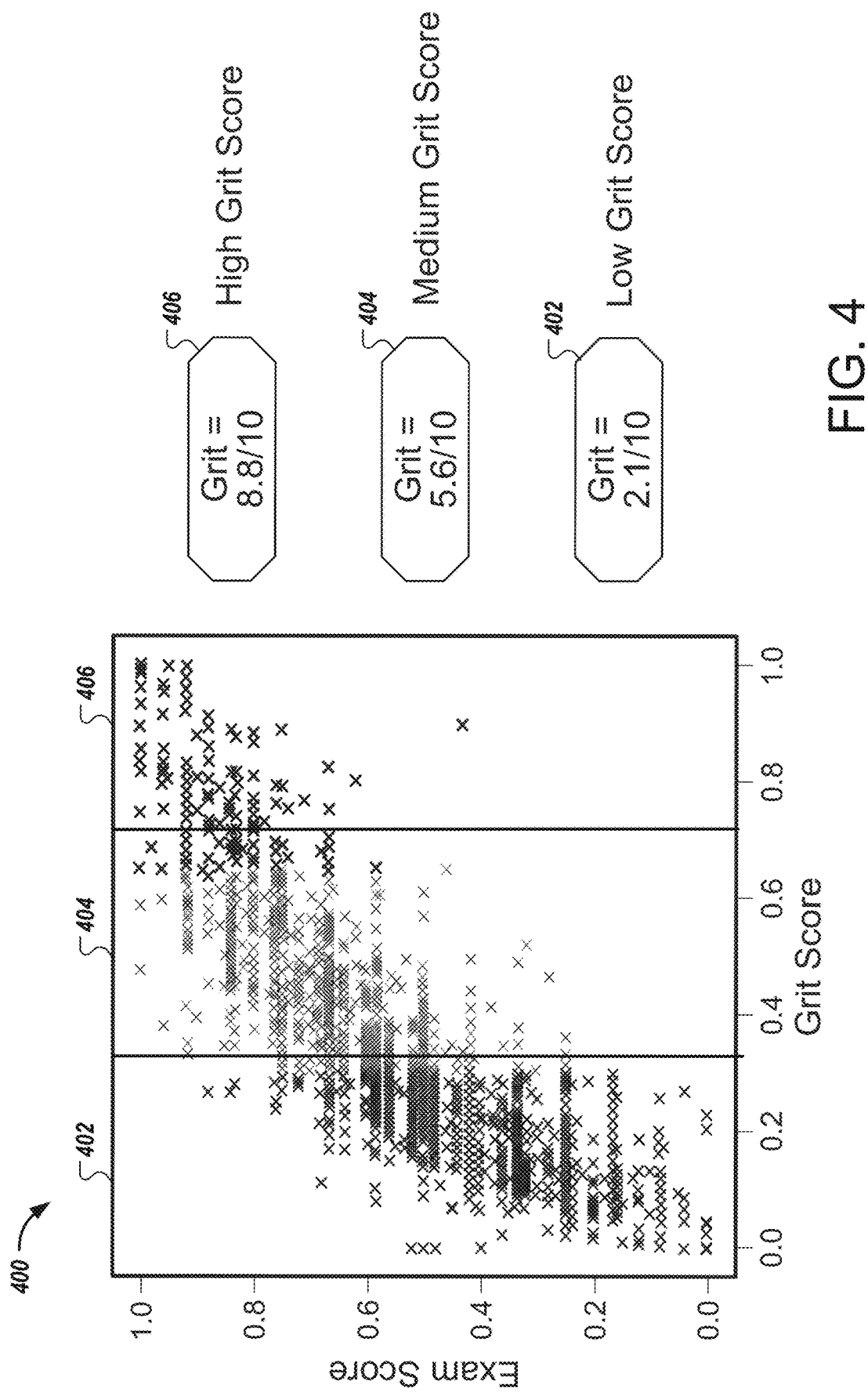
FIG. 4 is an illustration of example plots of grit score values versus exam score values.

FIG. 4 is an illustration 400 of example plots of grit score values versus exam score values. As previously mentioned, a strong correlation exists between a grit score of a particular user and an exam score, in an educational context. Moreover, the grit score is a clear indication of a user's performance, as illustrated by the plot shown in illustration 400. For example, the plot has been divided into three different sections to illustrate users with different grit scores—a low grit score 402, a medium grit score 404, and a high grit score 406. Each of these grit scores are associated with values shown in the boxes. Grit scores with 2.1 and below are low grit scores; scores with values between 2.1 and 5.6 are medium grit scores; and, scores with values of 8.8 and above are high grit scores. Likewise, this plot indicates that the higher the grit score corresponds to a higher exam score.

In some implementations, the knowledge server 104 can calculate the grit score for a student compare grit score to previous grit score for that same user over time. The knowledge server 104 can identify a pattern that is indicative of the user's performance. Moreover, the knowledge server 104 can determine that as a user's grit increases over time, the performance of the user, e.g., number of questions right divided by total number of questions for a task, also increases over time. As the knowledge server 104 calculates more grit scores, the knowledge server 104 can continuously build a more accurate model that illustrates the relationship between grit and performance. Additionally, the knowledge server 104 can build models between other cognitive and behavioral metrics and performance to determine if other direct correlations exist.

FIG. 5A is an illustration of example of anti-cheating identification. In some implementations, the knowledge server performs identity verification of the user writing with the writing implement. The knowledge server can determine, in addition to verifying user credentials, that the user writing with the writing implement is in fact who they say they are. Typically, one of the following methods can be used to perform identity verification: analyzing a photo or an image of a user's face, comparing a written signature to a signature on the back of a debit or credit card, and, a comparison through a fingerprint scanner, to name a few examples. The systems 100 and 101 can perform identity verification without using either of these typical methods, and rather, can perform identity verification by using just characteristics of the user's writing behavior, e.g., an amount of ink written by a user with the writing implement 108.

For example, as illustrated in FIG. 5A, the receiving device can prompt a series of characters, such as a phrase shown in box 502, for the user to write. The knowledge server, such as knowledge server 104, can provide the phrase for the user to write over a network. The phrase can be, for example, "The quick brown fox jumps over the lazy dog. In education today, students are assessed, too simplistically, on absolute scores. Since students learn at different levels and different speeds, this practice is outdated practice, inefficient and incomplete, leaving students either unchallenged or overburdened. To address this critical need for change in education, ANOTO introduced KAIT—a new and innovative AI—powered platform focused on enabling personalized learning and improving learning efficiencies. Our goal is to disrupt global education and improve efficiency for both teachers and students." In response to providing the statement to the user, the user writes this statement in his/her own handwriting using the writing implement on the receiving device. Then, the computing system, receiving device, and the writing implement can perform processes similar to the processes described with respect to stages (A) through (F) of systems 100 and 101.

Additionally, the knowledge server can extract, from the input data, features that indicate a characteristic of a writing behavior of the user while writing the designated phrase, e.g., the amount of ink written by user for each letter and each word. Moreover, the knowledge server can measure the amount of ink for each letter and/or for each word, which can correspond to a digital representation of an identification of the user. Other users can also write the same phrase, as shown in later figures, to have their identity verified. Generally, for the exact same phrase, each user will write the phrase using a different amount of ink that is unique to that user. The various letter sizes, word sizes, font size, writing style, stroke lengths, and pressure applied to the writing implement by each user can contribute to the unique ink amount, which can be used to identify a particular user. Thus, each user has a particular fingerprint in the manner in which they write. The digital ink amount represents the fingerprint unique to that individual.

As illustrated in FIG. 5A, the graph 504 illustrates the amount of ink used by Alex for writing the phrase shown in box 502. For example, when Alex wrote the phrase of "The quick brown fox jumps over the lazy dog," the knowledge server measured from the writing implement's data that an ink amount in row 1 of graph 504 includes [63.6, 74.56, 45.64, 68.05, 45.44, 76.89, 22.4] values, which was created by Alex for that particular phrase. In some implementations, the knowledge server can segment the phrase by various limiters. These limiters can include, for example, spaces, words, letters, every set number of letters, and the like. Other values are also shown in graph 504, which corresponds to Alex's unique fingerprinting for writing this phrase.

In response to measuring the ink amount shown in the graph 504, the knowledge server can compare the ink amount for each letter and/or word of the statement to one or more datasets of ink amounts for that user for the same statement. The knowledge server can store in a database, e.g., the user profiles database or another database, templates of ink amounts written for each letter by each user that uses the system. For example, the knowledge server can store an ink amount for each letter of the alphabet, both capital and lowercase, and for every number 1 through 100 for each user. The ink amounts can range from 0 to 100, with 1 being a very little amount of ink and 99 being a large amount of ink. Although more numbers exist than 1 to 100, the larger numbers can be identified by one or more combinations of the numbers listed between numbers 1 through 100. The knowledge server may request each user write out every letter (capital and lowercase) and numbers 1 through 100 with the writing implement before being able to use this system. In this manner, the knowledge server can store a template for each letter and number for each user.

Continuing with the example, the knowledge server can compare the ink amounts of [63.6, 74.56, 45.64], which can correspond either to "The quick brown fox" phrase or to one or more letters from that phrase, to ink amounts for similar words or letters written by Alex previously. If the knowledge server determines that the comparison amount is within a threshold, such as within 10 units of ink, then the knowledge server can determine that the user writing with the writing implement is in fact Alex based upon an additional comparison that Alex's provided credentials matches to the stored credentials. In some implementations, the credentials may be compared and verified before Alex is allowed to begin writing with the writing implement. In some implementations, if the knowledge server determines that the comparison amount is outside the threshold, such as 10 units of ink, then the knowledge server can determine that the user writing with the writing implement is not Alex, and can transmit a notification to a supervisor to indicate that Alex is cheating or another user not Alex is signed in and acting as Alex. In some implementations, if the knowledge server determines that the comparison is within the threshold, then the knowledge server can compare Alex's provided credentials to the stored credentials. If these credentials do not match, the knowledge server can indicate to Alex that the provided credentials are incorrect or indicate that the alleged Alex user is in fact another user. In some implementations, the comparison of each ink amount, for letters or words, must be below the threshold value for a match to occur. If one or a subset of ink amounts are outside the threshold, then a match does not exist, as further described below.

In some implementations, each letter or each word from the ink amounts must be within the threshold for the knowledge server to indicate that the user writing with the writing implement is in fact who they claim to be. If an ink amount associated with a letter or word is outside the threshold, e.g., the letter "e" in the word "the" from the phrase 502 has 21.2 ink, whereas the stored value of the letter "e" for Alex is 9 ink, then the knowledge server can deem that the user writing the phrase 502 is not Alex. However, other threshold values may be used to improve the accuracy of the system.

FIG. 5B is an illustration of an example of anti-cheating identification. FIG. 5B is similar to FIG. 5A, except that the user Angela wrote the phrase instead of Alex. Angela wrote the same phrase as Alex, yet as illustrated in FIG. 5B, Angela writes with a different style and font, and the knowledge server can determine that Angela writes the same phrase 508 with a different ink amount for each letter and word. The ink amounts exhibited by Angela are illustrated in graph 506. Clearly, graph 506 exhibits different ink amounts from the ink amounts exhibited in graph 504. Thus, the ink amount illustrated in graph 506 is unique to Angela and can be used as a fingerprint for identifying Angela.

FIG. 5C is an illustration of an example of anti-cheating identification. FIG. 5C is similar to FIGS. 5A and 5B, except that the user Aziz wrote the same phrase instead of Alex and Angels. Aziz wrote the same phase as Alex and Angela, yet as illustrated in FIG. 5C, Aziz writes with a different style and font, and the knowledge server can determine that Aziz writes the same phrase 512 with a different ink amount for each letter and word. The ink amounts exhibited by Aziz are illustrated in graph 510. Clearly, graph 510 exhibits different ink amounts from the ink amounts exhibited in both graphs 504 and 506. Thus, the ink amount illustrated in graph 510 is unique to Aziz and can be used as a fingerprint for identifying Aziz.

Figure 6A:
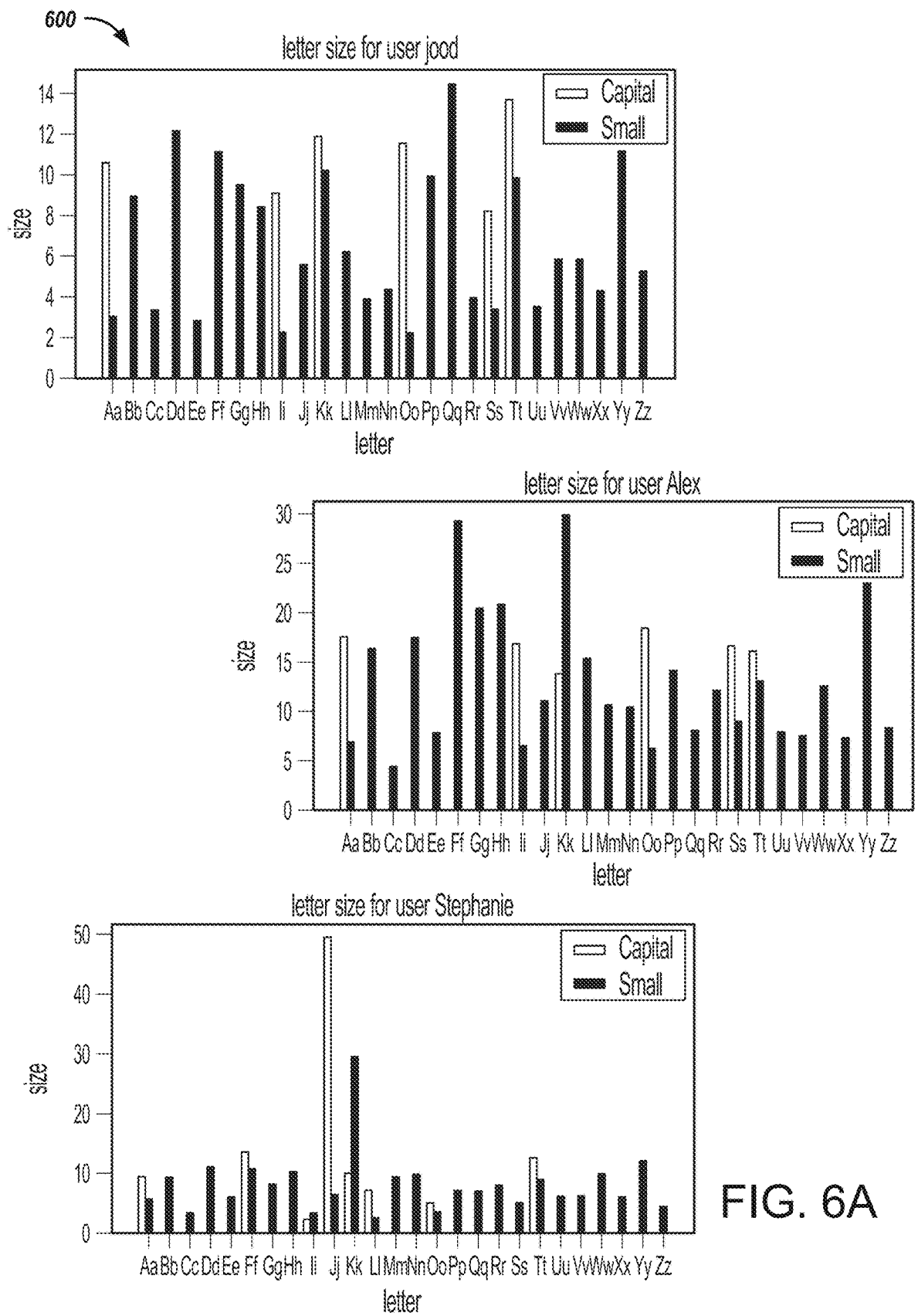
FIG. 6A-6B are illustrations of examples of plots showing individual heuristics for different letters for different users that use the writing implement.

FIG. 6A is an illustration of an example plot 600 showing individual heuristics for different letters for different users that use the writing implement. Not only does each user write with a unique amount, but also each user writes with a unique letter size. For example, the plots 600 illustrate three different plots for Jood, Alex, and Stephanie. The top plot illustrates the capital and lowercase letter sizes for Jood, the middle plot illustrates the capital and lowercase letter sizes for Alex, and the lower plot illustrates the capital and lowercase letter sizes for Stephanie. As illustrated, each user writes letters in different sizes. The sizes can be measured, for example, in height and length in centimeters, or a similar dimension.

In some implementations, to create these individual heuristics, the knowledge server may provide an indication to each user through a corresponding client device to write each letter of the alphabet in capital and lowercase and to write various numbers. The knowledge server can obtain data of each user writing the letters of the alphabet and the numbers and store ink amounts, sizes, other extracted features for each of these written letters/numbers, and generated cognitive and behavioral metrics for that user in a template, e.g., such as features and scores determined during stages (A) through (F) in systems 100 and 101. The template can indicate writing styles, fonts, and other extracted features that define a user's writing style. This knowledge server may ask each user to write these letters and numbers with the writing implement before being assigned a task. For example, the knowledge server can ask the user to write letters A-Z in lowercase and capital and numbers 1-100. The knowledge server can then use these templates for each user later when performing anti-cheating identification for that user.

By storing and tracking letter and number sizes for each user, the knowledge server can develop and extract heuristics about each particular user because letter and number sizes are also unique to the users. Heuristic analyses can be used to help identify a user and assist in identifying a user profile. Thus, when a user writes a particular word, the knowledge server can identify the amount of ink, the size of each letter and/or number, number of strokes, and other important features for that word, to identify that user because these features are unique to that user. Moreover, the knowledge server can look at heuristics from past data for that user, to develop an estimate of an expected amount of ink to be used. This comparison can be used to identify a particular individual and determine whether a particular individual writing with the writing implement is cheating. For example, if a user John regularly writes the letter 't' with the size of 12 and an ink amount of 20, then the knowledge server can determine that if the user John writes a letter T with the size of 12.2 and an ink amount of 19.5, then the knowledge server can determine with a high degree of confidence that John is who he says he is.

Figure 6B:
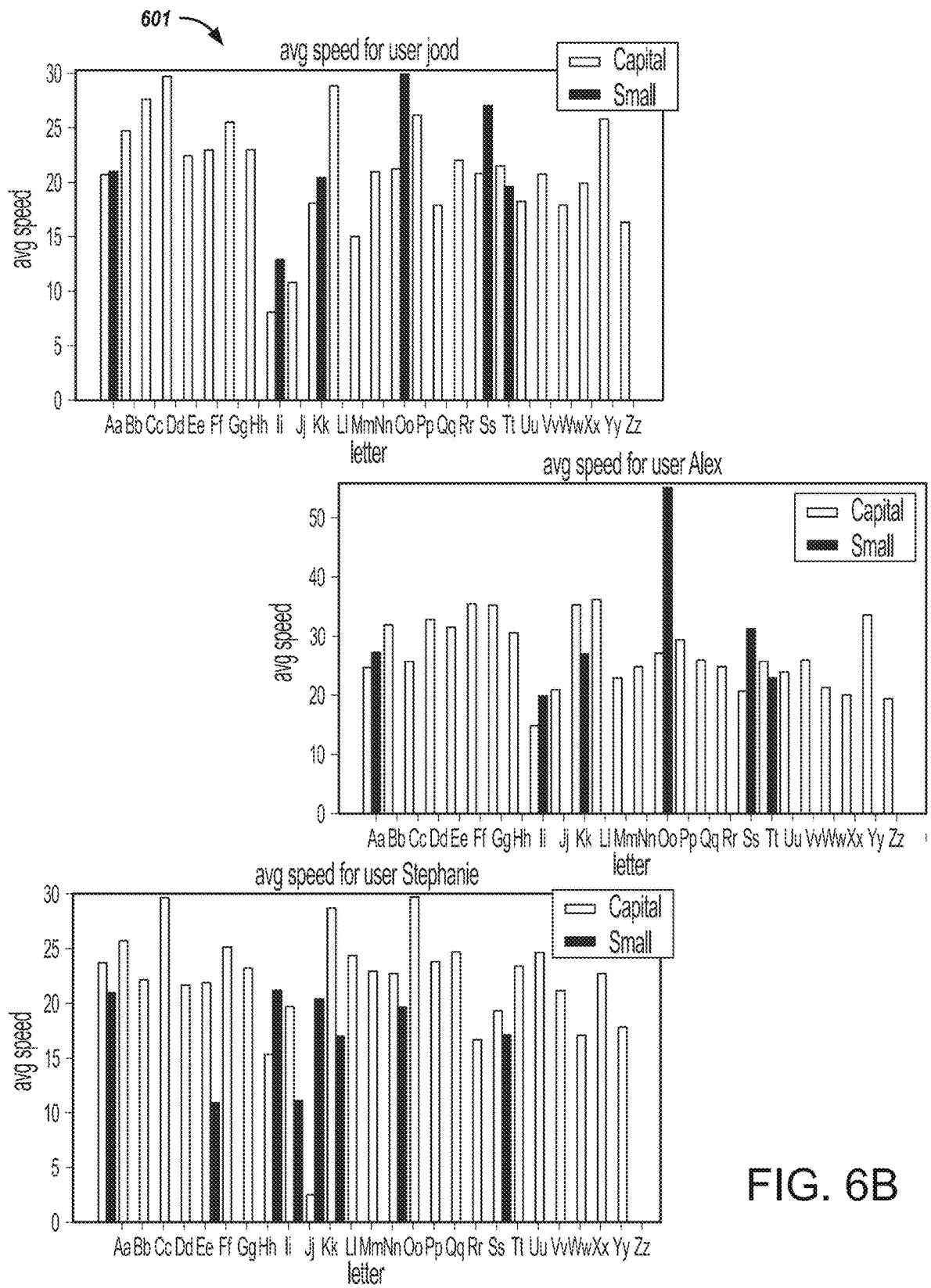

FIG. 6B is an illustration of an example plot 601 showing individual heuristics for different letters for different users that use the writing implement. The plots 601 illustrate three different plots for Jood, Alex, and Stephanie. The top plot illustrates the Jood's average speeds for writing capital and lowercase letters, the middle plot illustrates Alex's average speeds for writing capital and lowercase letters, and the lower plot illustrates Stephanie's average speeds for writing capital and lowercase letters. Similar to plots 600, each user writes at different speeds for the various letters. The knowledge server can similarly track the writing speeds for each user. These speeds can be relied upon at a later point, when each user performs a task, and the knowledge server can use heuristics to develop an estimate of an expected writing speed for the user.

FIG. 7 is a flow diagram that illustrates an example of a process 700 for determining cognitive and behavioral metrics of an individual using a writing implement. The knowledge server 104 or the computing system 102 can perform the process 700, for example.

In the process 700, the knowledge server obtains data from a writing implement, the data indicative of a user performing a task by writing with the writing implement against a receiving device (702). As the user writes with the writing implement against the receiving device or after the user completes writing with the writing implement against the receiving device for a task, the writing implement can provide raw data or biometric data to the knowledge server. In some implementations, both the writing implement and the receiving device may provide the biometric data to the knowledge server. The receiving device can be, for example, at least one of paper, smart paper, a tablet or a computer screen.

The data, obtained by the knowledge server, may include environmental data that include media illustrating (i) recorded video or images of the user performing the task with the writing implement, (ii) an environment in which the user is perform the task with the writing implement, and (iii) audio data recorded in the environment indicative of audible noises while the user is performing the task with the writing implement. Additionally, the data, obtained by the knowledge server, can also include test question data. The test question data can describe (i) one or more questions posed to the user to be answered with the writing implement and receiving device and (ii) a correct answer to each of the one or more questions. For example, the user can be posed to answer an algebra problem in a multiple choice question. The data, obtained by the knowledge server, can also include input data that describes (i) data identifying the writing implement and (ii) credentials of the user writing with the writing implement. When the knowledge server generates recommendations tailored to improve a performance of the user, the knowledge server can generate the recommendations based on the test question data, the input data, and the environmental data.

The knowledge server extracts features from the obtained data, the features indicating characteristics of a writing behavior of the user while the user performs the task with the writing implement (704). For example, the knowledge server can extract spatial features, temporal features, pressure features, textual features, and tilt features. The spatial features can describe spatial features of handwritten text produced by the user with the writing implement while performing the task. The temporal features can describe temporal elements of handwritten movements produced by the user with the writing implement while performing the task. The pressure features can describe a pressure recorded between a tip of the writing implement and the receiving device while the user performs the task. The textual features can describe the characteristics of the written letters and numbers with the writing implement, such as optical character recognition data of the textual features. The tilt features can describe one or more tilting angles of the writing implement while the user performs the task.

The knowledge server determines, based on at least some of the extracted features from the obtained data, metrics that reflect characteristics of the user (706). For example, the knowledge server can determine cognitive metrics that include a number sense metric, a memory visualization metric, a reasoning metric, and an applicable connections metric based on at least some of the extracted features. Additionally, the knowledge server can determine behavioral metrics that include a test taking skill metric, a grit metric, a concentration metric, and a question comprehension metric based on at least some of the extracted features.

The knowledge server generates a user profile for the user based on the extracted features, the determined metrics, or both (708). For example, the user profile can be a generated data structure that includes each of the cognitive metrics and the behavioral metrics for a user. The data structure can be, for example, a tuple, a data struct, a vector, an array, and the like. The knowledge server can associate received credentials with the generated user profile. The generated user profile can also store the extracted features. Additionally, the generated user profile can include data that monitors a user's performance over time, such as sets of cognitive and behavioral metrics.

Based on the features indicating characteristics of the writing behavior of the user, the knowledge server modifies the generated user profile as a performance of the user changes over time (710). For example, as the knowledge server generates new cognitive and behavioral metrics for a user each time the user performs a task, the knowledge server can update these metrics in a user's profile. The knowledge server may (i) recalculate the cognitive and behavioral metrics based on a moving average over time, (ii) recalculate the cognitive and behavioral metrics on a periodic basis, and (iii) erase the previously calculated cognitive and behavioral metrics and save the newly calculated cognitive and behavioral metrics with the user's profile. In some implementations, the knowledge server can store each of the previously calculated metrics so that the user or a supervisor of the user can monitor the user's performance progress.

For example, the user or the supervisor can monitor whether the user's performance progress is slowing, acceleration, or remaining constant over time. If the user's grit, number sense, and test taking metrics, for example, all appear to be increasing over time, then the user's performance may be increasing. In another example, if the user's grit, number sense, and test taking metric, for example, all appear to be decreasing over time, then the user's performance may be decreasing. More or less of the cognitive and behavioral metrics than those described in the previous examples may be used to determine if a user's performance is increasing or decreasing over time.

The knowledge server provides recommendations to improve the performance of the user associated with the generated user profile, the recommendations based on the determined metrics and the generated profile (712). The recommendations can also include an indication of whether a written response provided by the user is correct or incorrect, and the written response corresponds to the response written by the user performing the specified task. The recommendations can also include one or more of the cognitive and behavioral metrics, such as the grit metric, and one or more corrective actions to improve the performance of the user. The one or more corrective actions can include, for example, one of (i) instructions to perform additional tasks of a similar type to the task, (ii) instructions to reduce an amount of noise in an environment, and (iii) medical information of the user.

Based on a trend of performance of the user, the knowledge server can generate recommendations to provide to the user or a supervisor of the user. For example, the knowledge server may instruct the user to perform additional problem types to improve certain cognitive and behavioral metrics; instruct the user to adjust his environment if the knowledge server determines that some of the environmental aspects appear to be affecting the user's performance on tasks, e.g., such as loud music, a loud television, or loud individuals in the room. Additionally, the knowledge server can instruct the user or a supervisor with recommendations, such as, "Practice math in head," "Practice math problems on receiving device," or "Practice problems in a timed environment, to improve certain metrics, such as number sense, grit, and test taking.

FIG. 8 is a flow diagram that illustrates an example of a process 800 for validating an identity of a user. The knowledge server 104 or the computing system 102 can perform the process 800, for example.

In the process 800, the knowledge server obtains data from a writing implement, the data indicative of a user writing a series of characters with the writing implement on a receiving device (802). As the user writes with the writing implement against the receiving device or after the user completes writing with the writing implement against the receiving device for a task, the writing implement can provide data to the knowledge server.

The user can write a series of characters, e.g., letters, numbers, or other symbols, designed to match an instructional task. The task can indicate that the user write a phrase or one or more sentences. For example, the knowledge server may provide an indication that the user needs to write each letter of the alphabet in capital and lowercase letters along with numbers 1-100 on the receiving device with the writing implement. The knowledge server can also request the user write in different languages, write different symbols, and in different writing styles, such as cursive or italics. The knowledge server may request the user write the letters, numbers, and symbols to build a profile of characters for the user. Then, at a different time, the knowledge server may request the user write a different phrase, sentence, sentences, or paragraphs to ensure the user is in fact not cheating. The knowledge server can also perform user or identity authentication when the user performs other tasks, such as math problems or reading comprehension type problems.

In some implementations, both the writing implement and the receiving device may provide the data to the knowledge server. The receiving device can be, for example, at least one of paper, smart paper, a tablet or a computer screen. The data obtained from the writing implement in 802 is similar to the data obtained by the knowledge server in 702.

The knowledge server extracts features from the obtained data, the features indicating characteristics of a writing behavior of the user while writing the series of characters (804). 804 is similar to 704. For example, the knowledge server can extract spatial features, temporal features, pressure features, textual features, and tilt features. The spatial features can describe spatial features of handwritten text produced by the user with the writing implement while writing the series of characters. The temporal features can describe temporal elements of handwritten movements produced by the user with the writing implement while writing the series of characters. The pressure features can describe a pressure recorded between a tip of the writing implement and the receiving device while the user writes the series of characters. The textual features can describe the characteristics of the written letters and numbers with the writing implement, such as optical character recognition data of the textual features. The tilt features can describe one or more tilting angles of the writing implement while the user writes the series of characters.

The knowledge server compares a characteristic dataset based on the extracted features to one or more stored characteristic datasets for the same series of characters (806). For example, the knowledge server can measure an amount of ink generated by the writing implement for each character in the written series of characters. The characteristic dataset can include data based on the measured amount of ink for each character. Thus, the knowledge server can compare the characteristic dataset the one or more stored datasets by comparing the amount of ink for each character written by the user to the one or more stored datasets using a heuristic analysis. For example, if the user wrote the words "DOG PLAY", the knowledge server would measure an amount of ink for each character written by the user in the words "DOG PLAY" and compare that measured amount of ink for each written character to stored amounts of ink written previously for the same letters, e.g., "DOG PLAY". The knowledge server can use a heuristic analysis to perform the comparison between written ink amounts for certain letters to stored ink amounts of the same previously written letters.

The knowledge server, in response to identifying a stored characteristic dataset that matches the characteristic dataset based on the extracted features, can validate an identity of the user (808). The knowledge server can validate an identity of the user by determining whether credentials of the user, e.g., username and password, match to an identification of user associated with the identified stored dataset. For example, the knowledge server can determine whether the provided credentials matches stored credentials associated with the identified stored dataset. If a match exists, the knowledge server can determine that the user is not cheating, e.g., the user is who he claims to be.

However, if the knowledge server cannot identify a stored characteristic dataset that matches to the written series of characters, the knowledge server can provide an indication to the user or to the user's supervisor indicating that the user is cheating, and the user is not who he claims to be. For example, the user who claims to be "John" is not "John." If the knowledge server determines that the user's writing actually matches to another user's stored dataset, then the knowledge server can determine and provide an indication to a supervisor that (i) the user is cheating and (ii) the user is in fact someone another user. For example, the user who claims to be "John" is in fact "Mark," and in fact, the user "John" is cheating.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

obtaining, by the one or more computers, performance data from a smart pen, the performance data indicative of characteristics of a user performing a task by writing with the smart pen against a receiving device;

obtaining, by the one or more computers, environmental data that comprises (i) video or images of the user performing the task with the smart pen in an environment in which the user is performing the task with the smart pen or (ii) audio data indicative of noises in the environment while the user is performing the task with the smart pen;

extracting, by the one or more computers, features from the obtained performance data, the extracted features indicating characteristics of a writing behavior of the user while the user performs the task with the smart pen, wherein the extracted features comprise (i) spatial features of written data produced by the user with the smart pen while performing the task and (ii) tilt features that describe one or more tilting angles of the smart pen while the user performs the task;

determining, by the one or more computers, based on at least some of the extracted features from the obtained performance data and the obtained environmental data, metrics that reflect the characteristics of the user, the metrics comprising (i) a memory visualization metric that is determined using a correctness of the user's performance of that task, an average time to perform the task, a time for the user to perform the task, and a difficulty value representative of a difficulty of the task, and (ii) behavioral metrics that reflect behavioral characteristics of the user;

based on the extracted features and the determined metrics, generating, by the one or more computers, a user profile for the user;

based on the extracted features indicating the characteristics of the writing behavior of the user, modifying, by the one or more computers, the generated user profile as a performance of the user changes over time; and providing, by the one or more computers, recommendations to improve the performance of the user associated with the generated user profile, the recommendations based on the determined metrics and the generated user profile.

2. The method of claim 1, wherein the receiving device comprises at least one of paper, smart paper, a tablet, or a computer screen.

3. The method of claim 1, comprising:

obtaining, by the one or more computers, one or more of:

test question data that describe (i) one or more questions posed to the user to be answered with the smart pen and receiving device, (ii) a correct answer to each of the one or more questions, and (iii) an answer rubric, and input data that describe (i) data identifying the smart pen and (ii) credentials of the user writing with the smart pen; and wherein the recommendations to improve the performance of the user are further based on the test question data, the input data, or both.

4. The method of claim 1, wherein extracting the features from the obtained performance data comprises one or more of:

extracting, by the one or more computers, temporal features that describe temporal elements of handwritten movements produced by the user with the smart pen while performing the task;

extracting, by the one or more computers, pressure features that describe a pressure recorded between a tip of the smart pen and the receiving device while the user performs the task; and extracting, by the one or more computers, textual features that describe characteristics of written letters and numbers with the smart pen, wherein the textual features also comprise time stamps associated with each of handwritten text.

5. The method of claim 1, wherein determining metrics based on the at least some of the extracted features, comprising one or more of:

generating, by the one or more computers, a number sense metric;

generating, by the one or more computers, a reasoning metric; and generating, by the one or more computers, an applicable connections metric.

6. The method of claim 5, wherein determining metrics based on the at least some of the extracted features further comprises generating the behavioral metrics, comprising one or more of:

generating, by the one or more computers, a test taking skill metric;

generating, by the one or more computers, a grit metric;

generating, by the one or more computers, a concentration metric; and generating, by the one or more computers, a question comprehension metric.

7. The method of claim 6, wherein generating the user profile comprises generating, by the one or more computers, a score associated with each of the number sense metric, the memory visualization metric, the reasoning metric, the applicable connections metric, the test taking skill metric, the grit metric, the concentration metric, and the question comprehension metric.

8. The method of claim 1, wherein providing the recommendations to improve the performance of the user comprises providing, to a computing device associated with the user or a supervisor of the user, one or more of:

an indication of whether a written response by the user is correct or incorrect, the written response associated with the user performing the task;

a grit metric; and one or more corrective actions to improve performance of the user, the one or more corrective actions comprising at least one of (i) instructions to perform additional tasks of a similar type to the task, (ii) instructions to reduce an amount of noise in an environment, (iii) medical information of the user, and (iv) instructions to change writing approach.

9. The method of claim 1, further comprising:
comparing, by the one or more computers, the generated user profile to stored profiles; and
identifying, by the one or more computers, the user based on a match between the generated user profile and one of the stored profiles.

10. The method of claim 1, wherein obtaining the environmental data comprises obtaining the environmental data from the smart pen.

11. The method of claim 1, wherein obtaining the environmental data comprises obtaining the environmental data from an external device distinct from the smart pen.

12. The method of claim 1, wherein the characteristics of the user performing the task by writing with the smart pen comprise pen data captured while the user performs the task, the pen data comprising data indicative of written text, positional data of the smart pen, speed of the smart pen, pressure applied by the smart pen to the receiving device, and timestamps associated with the writing data points.

13. A system comprising:
one or more computers and one or more storage devices storing instructions that are operable, when executed by the one or more computers, to cause the one or more computers to perform operations comprising:
obtaining, by the one or more computers, performance data from a smart pen, the performance data indicative of characteristics of a user performing a task by writing with the smart pen against a receiving device;
obtaining, by the one or more computers, environmental data that comprises (i) video or images of the user performing the task with the smart pen in an environment in which the user is performing the task with the smart pen or (ii) audio data indicative of noises in the environment while the user is performing the task with the smart pen;
extracting, by the one or more computers, features from the obtained performance data, the extracted features indicating characteristics of a writing behavior of the user while the user performs the task with the smart pen, wherein the extracted features comprise (i) spatial features of written data produced by the user with the smart pen while performing the task and (ii) tilt features that describe one or more tilting angles of the smart pen while the user performs the task;
determining, by the one or more computers, based on at least some of the extracted features from the obtained performance data and the obtained environmental data, metrics that reflect the characteristics of the user, the metrics comprising ci) a memory visualization metric that is determined using a correctness of the user's performance of that task, an average time to perform the task, a time for the user to perform the task, and a difficulty value representative of a difficulty of the task, and (ii) behavioral metrics that reflect behavioral characteristics of the user;
based on the extracted features and the determined metrics,
generating, by the one or more computers, a user profile for the user;
based on the extracted features indicating the characteristics of the writing behavior of the user, modifying, by the one or more computers, the generated user profile as a performance of the user changes over time; and
providing, by the one or more computers, recommendations to improve the performance of the user associated with the generated user profile, the recommendations based on the determined metrics and the generated user profile.

14. The system of claim 13, wherein the receiving device comprises at least one of paper, smart paper, a tablet, or a computer screen.

15. The system of claim 13, comprising:
obtaining, by the one or more computers, one or more of:
test question data that describe (i) one or more questions posed to the user to be answered with the smart pen and receiving device, (ii) a correct answer to each of the one or more questions, and (iii) an answer rubric, and
input data that describe (i) data identifying the smart pen and (ii) credentials of the user writing with the smart pen; and
wherein the recommendations to improve the performance of the user are further based on the test question data, the input data, or both.

16. The system of claim 13, wherein extracting the features from the obtained performance data comprises one or more of:
extracting, by the one or more computers, temporal features that describe temporal elements of handwritten movements produced by the user with the smart pen while performing the task;
extracting, by the one or more computers, pressure features that describe a pressure recorded between a tip of the smart pen and the receiving device while the user performs the task; and
extracting, by the one or more computers, textual features that describe characteristics of written letters and numbers with the smart pen, wherein the textual features also comprise time stamps associated with each of handwritten text.

17. The system of claim 13, wherein determining metrics based on the at least some of the extracted features, comprising one or more of:
generating, by the one or more computers, a number sense metric;
generating, by the one or more computers, a reasoning metric; and
generating, by the one or more computers, an applicable connections metric.

18. The system of claim 17, wherein determining metrics based on the at least some of the extracted features further comprises generating the behavioral metrics, comprising one or more of:
generating, by the one or more computers, a test taking skill metric;
generating, by the one or more computers, a grit metric;
generating, by the one or more computers, a concentration metric; and
generating, by the one or more computers, a question comprehension metric.

19. The system of claim 18, wherein generating the user profile comprises generating, by the one or more computers, a score associated with each of the number sense metric, the memory visualization metric, the reasoning metric, the applicable connections metric, the test taking skill metric, the grit metric, the concentration metric, and the question comprehension metric.

20. The system of claim 13, wherein providing the recommendations to improve the performance of the user comprises providing, to a computing device associated with the user or a supervisor of the user, one or more of:

an indication of whether a written response by the user is correct or incorrect, the written response associated with the user performing the task;

a grit metric; and one or more corrective actions to improve performance of the user, the one or more corrective actions comprising at least one of (i) instructions to perform additional tasks of a similar type to the task, (ii) instructions to reduce an amount of noise in an environment, (iii) medical information of the user, and (iv) change writing approach.

21. A non-transitory computer-readable medium storing software comprising instructions executable by one or more computers which, upon such execution, cause the one or more computers to perform operations comprising:

obtaining, by the one or more computers, performance data from a smart pen, the performance data indicative of characteristics of a user performing a task by writing with the smart pen against a receiving device;

obtaining, by the one or more computers, environmental data that comprises (i) video or images of the user performing the task with the smart pen in an environment in which the user is performing the task with the smart pen or (ii) audio data indicative of noises in the environment while the user is performing the task with the smart pen;

extracting, by the one or more computers, features from the obtained performance data, the extracted features indicating characteristics of a writing behavior of the user while the user performs the task with the smart pen, wherein the extracted features comprise (i) spatial features of written data produced by the user with the smart pen while performing the task and (ii) tilt features that describe one or more tilting angles of the smart pen while the user performs the task;

determining, by the one or more computers, based on at least some of the extracted features from the obtained performance data and the obtained environmental data, metrics that reflect the characteristics of the user, the metrics comprising (i) a memory visualization metric that is determined using a correctness of the user's performance of that task, an average time to perform the task, a time for the user to perform the task, and a difficulty value representative of a difficulty of the task, and (ii) behavioral metrics that reflect behavioral characteristics of the user;

based on the extracted features and the determined metrics, generating, by the one or more computers, a user profile for the user;

based on the extracted features indicating the characteristics of the writing behavior of the user, modifying, by the one or more computers, the generated user profile as a performance of the user changes over time; and providing, by the one or more computers, recommendations to improve the performance of the user associated with the generated user profile, the recommendations based on the determined metrics and the generated user profile.

* * * * *